US006430539B1

(12) United States Patent
Lazarus et al.

(10) Patent No.: US 6,430,539 B1
(45) Date of Patent: Aug. 6, 2002

(54) PREDICTIVE MODELING OF CONSUMER FINANCIAL BEHAVIOR

(75) Inventors: Michael A. Lazarus, Del Mar; A. U. Mattias Blume, San Diego; Kenneth B. Brown, San Diego; William R. Caid, San Diego; Ted E. Dunning, San Diego; Larry S. Peranich, San Diego; Gerald R. Russell, San Diego; Kevin L. Sitze, San Diego, all of CA (US)

(73) Assignee: HNC Software, San Diego, CA (US)

( * ) Notice: Subject to any disclaimer, the term of this patent is extended or adjusted under 35 U.S.C. 154(b) by 0 days.

(21) Appl. No.: 09/306,237

(22) Filed: May 6, 1999

(51) Int. Cl.[7] .............................................. G06F 17/60
(52) U.S. Cl. ............................ 705/10; 706/6; 705/14; 705/26
(58) Field of Search .............................. 705/10, 14, 26; 706/6

(56) References Cited

U.S. PATENT DOCUMENTS

| | | | |
|---|---|---|---|
| 4,908,761 A | 3/1990 | Tai | 705/14 |
| 5,201,010 A | 4/1993 | Deaton et al. | 382/139 |
| 5,299,115 A | 3/1994 | Fields et al. | 705/10 |
| 5,317,507 A | 5/1994 | Gallant | 707/532 |
| 5,325,298 A | 6/1994 | Gallant | 704/9 |
| 5,389,773 A | 2/1995 | Coutts et al. | 705/43 |
| 5,459,656 A | 10/1995 | Fields et al. | 705/7 |
| 5,619,709 A | 4/1997 | Caid et al. | 707/532 |
| 5,642,485 A | 6/1997 | Deaton et al. | 705/14 |
| 5,675,662 A | 10/1997 | Deaton et al. | 382/137 |
| 5,712,985 A | 1/1998 | Lee et al. | 705/7 |
| 5,819,226 A | 10/1998 | Gopinathan et al. | 705/44 |
| 5,832,457 A | 11/1998 | O'Brien et al. | 705/14 |
| 6,026,397 A | * 2/2000 | Sheppard | 707/5 |
| 6,073,112 A | * 6/2000 | Geerlings | 705/14 |
| 6,078,893 A | * 6/2000 | Ouimet et al. | 705/10 |
| 6,189,005 B1 | * 2/2001 | Chakrabarti et al. | 707/6 |

FOREIGN PATENT DOCUMENTS

WO  WO-0002138 A1 * 1/2000 ........... G06F/15/21

OTHER PUBLICATIONS

Saarenvirta. Data mining for direct mail. Miller–Freeman. DB2 Magazine, vol. 4, No. 1, pp. 40–42, 44–49.*
Phillips Business Information. HNC System Sheds New Light on Cardholder Profile. Potomac: Card News, Dec. 7, 1998, v13, n23, p. 4–5.*
Chaturvedi. A feature–based approach to market segmentation via overlapping K–centroids clustering. Journal of Marketing Research, Aug. 1997, v34, n3, p. 370–377.*
Stewart, G.A., "PROPHETable SOFTWARE", Byte, pp. 97–101, Apr. 1998 Issue.

* cited by examiner

Primary Examiner—Kyle J. Choi
Assistant Examiner—D Robertson
(74) Attorney, Agent, or Firm—Fenwick & West LLP

(57) ABSTRACT

Predictive modeling of consumer financial behavior is provided by application of consumer transaction data to predictive models associated with merchant segments. Merchant segments are derived from consumer transaction data based on co-occurrences of merchants in sequences of transactions. Merchant vectors representing specific merchants are clustered to form merchant segments in a vector space as a function of the degree to which merchants co-occur more or less frequently than expected. Each merchant segment is trained using consumer transaction data in selected past time periods to predict spending in subsequent time periods for a consumer based on previous spending by the consumer. Consumer profiles describe summary statistics of consumer spending in and across merchant segments. Analysis of consumers associated with a segment identifies selected consumers according to predicted spending in the segment or other criteria, and the targeting of promotional offers specific to the segment and its merchants.

19 Claims, 10 Drawing Sheets

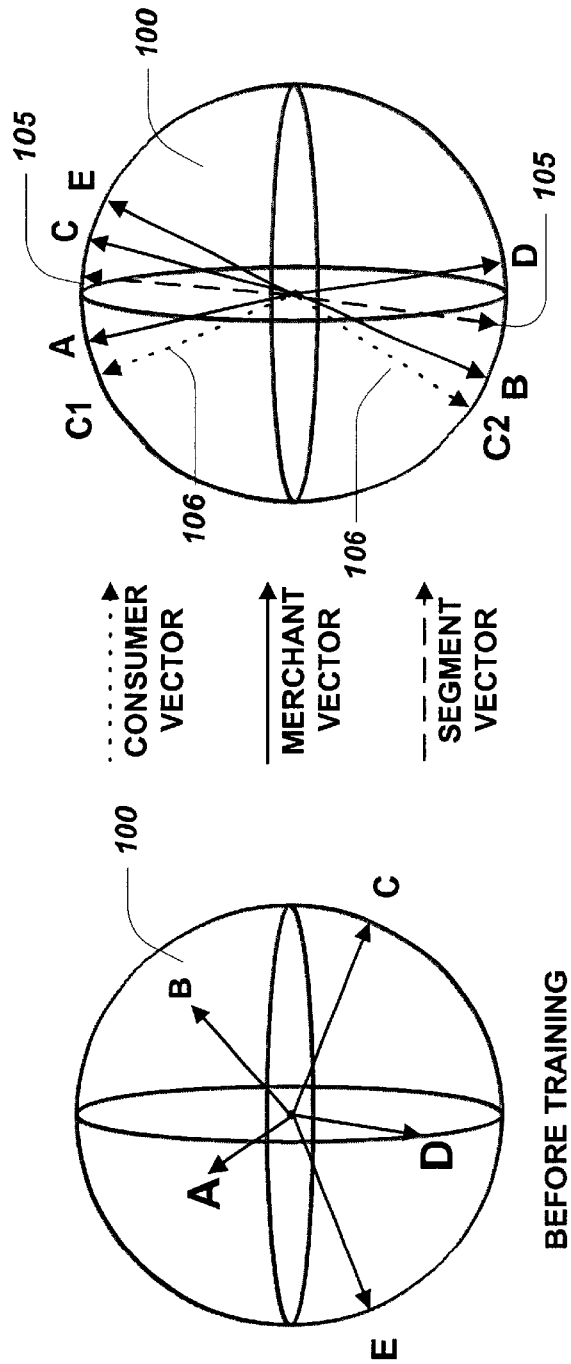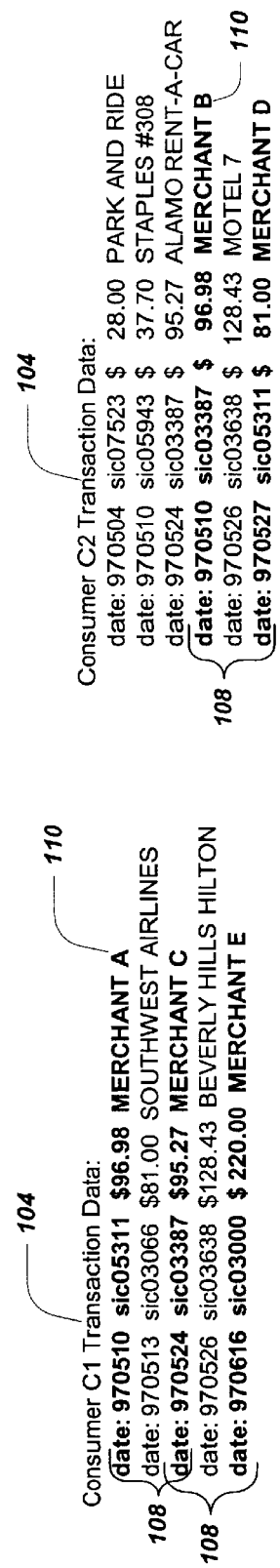
A=Upscale clothing  B=Discount furniture  C=Upscale furniture  D=Discount clothing  E=Online jewelry
FIG. 1a BEFORE TRAINING
FIG. 1b AFTER TRAINING
FIG. 1c

SAMPLE MERCHANT SEGMENT INDEX

```
       200     202         204              206   208
```
(1):  Direct Marketing: Housewares Appliances: Senior: CA:WA  210
(2):  Retail: Mall: Sporting Goods and Entertainment: Young adult

...

(18): Travel: Tourist: Golf: Traveler
(19): Retail: Department Stores: Furniture
(20): Retail: Mall: Clothing and Accessories: Male and Female
(21): Retail: Shoes: Furniture and Accessories

....

(103): Direct Marketing: Social Services: Religion
(104): Retail: Clothing: Family: SE Pennsylvania
(105): Direct Marketing: Internet and Catalog: PCs: Adult
(106): Retail: Housewares and Utilities: Homeowners
(107): Retail: Auto: Housewares: Virginia
(108): Retail: Housewares: Homeowners: CA: NV: WA

....

(173): Retail: Computers: Sports: Student: RI
(174): Services: Financial: Casinos: Gamblers:
(175): Retail: Home and Accessories
(176): Education: Tuition: Books: Student: RI

....

(206): Retail: Direct Market: Catalog: Women Clothing: Female
(207): Retail: Home Improvement: Female
(208): Direct Marketing: Catalog: Office Supplies: Business Owners
(209): Retail: Department Stores: General Merch: Youth
(210): Retail: Furniture: Recreation: Student: CA
(211): Direct Marketing: Catalog
(212): Retail: Sporting Goods: Tennis: Male

....

(253): Retail: Books: Electronics: Jewelry
(254): Recreation: Sports Fans: Hardware: Male: CA
(255): Direct Marketing: Electronics: Male
(256): Retail: Electronics: Office Supplies
(257): Retail: Electronics
(258): Retail: Yard and Garden: Automotive: NV

....

(299): Retail: Household: Yard and Garden: NV
(300): Direct Marketing: Catalog: Music

FIG. 2

FORWARD CO-OCCURRENCE WINDOWS

BACKWARD CO-OCCURRENCE WINDOWS

...
date: 970510 sic05943 $  37.70  STAPLES #308
date: 970510 sic05311 $  96.98  NORDSTROM JEWEL
date: 970513 sic03066 $  81.00  SOUTHWEST AIRLINES
date: 970524 sic03387 $  95.27  ALAMO LAX
date: 970526 sic03638 $  128.43 BEVERLY HILLS HILTON
date: 970616 sic03000 $  220.00 STAPLES #225
date: 970617 sic03066 $  194.00 SOUTHWEST AIRLINES
date: 970623 sic03700 $  13.44  ALAMO SAN FRANCISCO
date: 970629 sic07538 $  41.25  SAN FRANCISCO HILTON
date: 970703 sic05311 $  88.76  NORDSTROM MENS STORE
...

*FIG. 7a*

...
date: 970510 sic05943 $  37.70  STAPLES
date: 970510 sic05311 $  96.98  NORDSTROM
date: 970513 sic03066 $  81.00  SOUTHWEST_AIRLINES
date: 970524 sic03387 $  95.27  ALAMO — 702
date: 970526 sic03638 $  128.43 HILTON — 704
date: 970616 sic03000 $  220.00 STAPLES
date: 970617 sic03066 $  194.00 SOUTHWEST_AIRLINES
date: 970623 sic03700 $  13.44  ALAMO
date: 970629 sic07538 $  41.25  HILTON
date: 970703 sic05311 $  88.76  NORDSTROM
...

PREDICTIVE MODELING OF CONSUMER FINANCIAL BEHAVIOR

BACKGROUND

1. Field of Invention

The present invention relates generally to analysis of consumer financial behavior, and more particularly to analyzing historical consumer financial behavior to accurately predict future spending behavior, and more particularly, future spending in specifically identified data-driven industry segments.

2. Background of Invention

Retailers, advertisers, and many other institutions are keenly interested in understanding consumer spending habits. These companies invest tremendous resources to identify and categorize consumer interests, in order to learn how consumers spend money. If the interests of an individual consumer can be determined, then it is believed that advertising and promotions related to these interests will be more successful in obtaining a positive consumer response, such as purchases of the advertised products or services.

Conventional means of determining consumer interests have generally relied on collecting demographic information about consumers, such as income, age, place of residence, occupation, and so forth, and associating various demographic categories with various categories of interests and merchants. Interest information may be collected from surveys, publication subscription lists, product warranty cards, and myriad other sources. Complex data processing is then applied to the source of data resulting in some demographic and interest description of each of a number of consumers.

This approach to understanding consumer behavior often misses the mark. The ultimate goal of this type of approach, whether acknowledged or not, is to predict consumer spending in the future. The assumption is that consumers will spend money on their interests, as expressed by things like their subscription lists and their demographics. Yet, the data on which the determination of interests is made is typically only indirectly related to the actual spending patterns of the consumer. For example, most publications have developed demographic models of their readership, and offer their subscription lists for sale to others interested in the particular demographics of the publication's readers. But subscription to a particular publication is a relatively poor indicator of what the consumer's spending patterns will be in the future.

Even taking into account multiple different sources of data, such as combining subscription lists, warranty registration cards, and so forth still only yields an incomplete collection of unrelated data about a consumer.

One of the problems in these conventional approaches is that spending patterns are time based. That is, consumers spend money at merchants which are of interest to them in typically a time related manner. For example, a consumer who is a business traveler spends money on plane tickets, car rentals, hotel accommodations, restaurants, and entertainment all during a single business trip. These purchases together more strongly describe the consumer's true interests and preferences than any single one of the purchases alone. Yet conventional approaches to consumer analysis typically treats these purchases individually and as unrelated in time.

Yet another problem with conventional approaches is that categorization of purchases is often based on standardized industry classifications of merchants and business, such as the SIC codes. This set of classification is entirely arbitrary, and has little to do with actual consumer behavior. Consumer do not decide which merchants to purchase from based on their SIC code. Thus, the use of arbitrary classifications to predict financial behavior is doomed to failure, since the classifications have little meaning in the actual data of consumer spending.

A third problem is that different groups of consumers spend money in different ways. For example, consumers who frequent high-end retailers have entirely different spending habits than consumers who are bargain shoppers. To deal with this problem, most systems focus exclusively on very specific, predefined types of consumers, in effect, assuming that the interests or types of consumers are known, and targeting these consumers with what are believed to be advertisements or promotions of interest to them. However, this approach essentially puts the cart before the proverbial horse: it assumes the interests and spending patterns of a particular group of consumers, it does not discover them from actual spending data. It thus begs the questions as to whether the assumed group of consumers in fact even exists, or has the interest that are assumed for it.

Accordingly, what is needed is the ability to model consumer financial behavior based on actual historical spending patterns that reflect the time-related nature of each consumer's purchase. Further, it is desirable to extract meaningful classifications of merchants based on the actual spending patterns, and from the combination of these, predict future spending of an individual consumer in specific, meaningful merchant groupings.

In the application domain of information, and particularly text retrieval, vector based representations of documents and words is known. Vector space representations of documents are described in U.S. Pat. No. 5,619,709 issued to Caid et. al, and in U.S. Pat. No. 5,325,298 issued to Gallant. Generally, vectors are used to represent words or documents. The relationships between words and between documents is learned and encoded in the vectors by a learning law. However, because these uses of vector space representations, including the context vectors of Caid, are designed for primarily for information retrieval, they are not effective for predictive analysis of behavior when applied to documents such as credit card statements and the like. When the techniques of Caid were applied to the prediction problems, it had numerous shortcomings. First, it had problems dealing with high transaction count merchants. These are merchants whose names appear very frequently in the collections of transaction statements. Because Caid's system downplays the significance of frequently appearing terms, these high transaction frequency merchants were not being accurately represented. Excluding high transaction frequency merchants from the data set however undermines the system's ability to predict transactions in these important merchants. Second, it was discovered that past two iterations of training, Caid's system performance declined, instead of converging. This indicates that the learning law is learning information that is only coincidental to transaction prediction, instead of information that is specifically for transaction prediction. Accordingly, it is desirable to provide a new methodology for learning the relationships between merchants and consumers so as to properly reflect the significance of the frequency with which merchants appears in the transaction data.

SUMMARY OF THE INVENTION

The present invention overcomes the limitations of conventional approaches to consumer analysis by providing a system and method of analyzing and predicting consumer financial behavior that uses historical, and time-sensitive, spending patterns of individual consumers to create both meaningful groupings (segments) of merchants which accurately reflect underlying consumer interests, and a predictive model of consumer spending patterns for each of the merchant segment. Current spending data of an individual consumer or groups of consumers can then be applied to the predictive models to predict future spending of the consumers in each of the merchant clusters.

In one aspect, the present invention includes the creation of data-driven grouping of merchants, based essentially on the actual spending patterns of a group of consumers. Spending data of each consumer is obtained, which describes the spending patterns of the consumers in a time-related fashion. For example, credit card data demonstrates not merely the merchants and amounts spent, but also the sequence in which purchases were made. One of the features of the invention is its ability to use the co-occurrence of purchases at different merchants to group merchants into meaningful merchant segments. That is, merchants which are frequently shopped at within some number of transactions or time period of each other reflect a meaningful cluster. This data-driven clustering of merchants more accurately describes the interests or preferences of consumers.

In a preferred embodiment, the analysis of consumer spending uses spending data, such as credit card statements, and processes that data to identify co-occurrences of purchases within defined co-occurrence windows, which may be based on either a number of transactions, a time interval, or other sequence related criteria. Each merchant is associated with vector representation; the initial vectors for all of the merchants are randomized to present a quasi-orthogonal set of vectors in a merchant vector space. Each consumer's transaction data reflecting their purchases (e.g. credit card statements, bank statements, and the like) is chronologically organized to reflect the general order in which purchases were made at the merchants. Analysis of each consumer's transaction data in various co-occurrence windows identifies which merchants co-occur. For each pair of merchants, their respective merchant vectors are updated in the vector space as a function of their frequency of their co-occurrence. After processing of the spending data, the merchant vectors of merchants which are frequented together are generally aligned in the same direction in the merchant vector space. Clustering techniques are then applied to find clusters of merchants based on their merchant vectors. These clusters form the merchant segments, with each merchant segment having a list of merchants in it. Each merchant segment yields useful information about the type of merchants, their average purchase and transaction rates, and other statistical information. (Merchant "segments" and merchant "clusters" are used interchangeably herein.)

Preferably, each consumer is also given a profile that includes various demographic data, and summary data on spending habits. In addition, each consumer is preferably given a consumer vector. From the spending data, the merchants that the consumer has most frequently or recently purchased is determined. The consumer vector is then the summation of these merchant vectors. As new purchases are made, the consumer vector is updated, preferably decaying the influence of older purchases. In essence, like the expression "you are what you eat," the present invention reveals "you are whom you shop at," since the vectors of the merchants are used to construct the vectors of the consumers.

An advantage of this approach is that both consumers and merchants are represented in a common vector space. This means that given a consumer vector, the merchant vectors which are "similar" to this consumer vector can be readily determined (that is they point in generally the same direction in the merchant vector space), for example using dot product analysis. Thus, merchants who are "similar" to the consumer can be easily determined, these being merchants who would likely be of interest to the consumer, even if the consumer has never purchased from these merchants before.

Given the merchant segments, the present invention then creates a predictive model of future spending in each merchant segment, based on transaction statistics of historical spending in the merchant segment by those consumers who have purchased from merchants in the segments, in other segments, and data on overall purchases. In one embodiment, each predictive model predicts spending in a merchant cluster in a predicted time interval, such as 3 months, based on historical spending in the cluster in a prior time interval, such as the previous 6 months. During model training, the historical transactions in the merchant cluster for consumers who spent in the cluster, is summarized in each consumer's profile in summary statistics, and input into the predictive model along with actual spending in a predicted time interval. Validation of the predicted spending with actual spending is used to confirm model performance. The predictive models may be a neural networks, or other multivariate statistical model.

This modeling approach is advantageous for two reasons. First, the predictive models are specific to merchant clusters that actually appear in the underlying spending data, instead of for arbitrary classifications of merchants such as SIC classes. Second, because the consumer spending data of those consumers who actually purchased at the merchants in the merchant clusters is used, they most accurately reflect how these consumer have spent and will spend at these merchants.

To predict financial behavior, the consumer profile of a consumer, using preferably the same type of summary statistics for a recent, past time period, is input into the predictive models for the different merchant clusters. The result is a prediction of the amount of money that the consumer is likely to spend in each merchant cluster in a future time interval, for which no actual spending data may yet be available.

For each consumer, a membership function may be defined which describes how strongly the consumer is associated with each merchant segment. (Preferably, the membership function outputs a membership value for each merchant segment.) The membership function may be the predicted future spending in each merchant segment, or it may be a function of the consumer vector for the consumer and a merchant segment vector (e.g. centroid of each merchant segment). The membership function can be weighted by the amount spent by the consumer in each merchant segment, or other factors. Given the membership function, the merchant clusters for which the consumer has the highest membership values are of particular interest: they are the clusters in which the consumer will spend the most money in the future, or whose spending habits are most similar to the merchants in the cluster. This allows very specific and accurate targeting of promotions, advertising and the like to these consumers. A financial institution using the predicted spending information can direct promotional offers to consumers who are predicted to spend heavily in a merchant segment, with the promotional offers associated with merchants in the merchant segment.

Also, given the membership values, changes in the membership values can be readily determined over time, to identify transitions by the consumer between merchants segments of interest. For example, each month (e.g. after a new credit card billing period or bank statement), the membership function is determined for a consumer, resulting in a new membership value for each merchant cluster. The new membership values can be compared with the previous month's membership values to indicate the largest positive and negative increases, revealing the consumer's changing purchasing habits. Positive changes reflect purchasing interests in new merchant clusters; negative changes reflect the consumer's lack of interest in a merchant cluster in the past month. Segment transitions such as these further enable a financial institution to target consumers with promotions for merchants in the segments in which the consumers show significant increases in membership values.

In another aspect, the present invention provides an improved methodology for learning the relationships between merchants in transaction data, and defining vectors which represent the merchants. More particularly, this aspect of the invention accurately identifies and captures the patterns of spending behavior which result in the co-occurrence of transactions at different merchants. The methodology is generally as follows:

First, the number of times that each pair of merchants co-occur with one another in the transaction data is determined. The underlying intuition here is that merchants whom the consumers' behaviors indicates as being related will occur together often, whereas unrelated merchants do not occur together often. For example, a new mother will likely shop at children's clothes stores, toy stores, and other similar merchants, whereas a single young male will likely not shop at these types of merchants. The identification of merchants is by counting occurrences of merchants' names in the transaction data. The merchants' names may be normalized to reduce variations and equate different versions of a merchant's name to a single common name.

Next, a relationship strength between each pair of merchants is determined based on how much the observed co-occurrence of the merchants deviated from an expected co-occurrence of the merchant pair. The expected co-occurrence is based on statistical measures of how frequently the individual merchants appear in the transaction data or in co-occurrence events. Various relationship strength measures may be used, based on for example, standard deviations of predicted co-occurrence, or log-likelihood ratios.

The relationship strength measure has the features that two merchants that co-occur significantly more often than expected are positively related to one another; two merchants that co-occur significantly less often than expected are negatively related to one another, and two merchants that co-occur about the number of times expected are not related.

The relationship strength between each pair of merchants is then mapped into the vector space. This is done by determining the desired dot product between each pair of merchant vectors as a function of the relationship strength between the pair of merchants. This step has the feature that merchant vectors for positively related merchants have a positive dot product, the merchant vectors for negatively related merchants have a negative dot product, and the merchant vectors for unrelated merchants have a zero dot product.

Finally, given the determined dot products for merchant vector pairs, the locations of the merchant vectors are updated so that actual dot products between them at least closely approximate the desired dot products previously determined.

The present invention also includes a method for determining whether any two strings represent the same thing, such as variant spellings of a merchant name. This aspect of the invention is beneficially used to identify and normalize merchant names given what is typically a variety of different spellings or forms of a same merchant name in large quantities of transaction data. In this aspect of the invention, the frequency of individual trigrams (more generally, n-grams) for a set of strings, such as merchant names in transaction data, is determined. Each trigram is given a weight base on its frequency. Preferably, frequently occurring trigrams are assigned low weights, while rare trigrams are assigned high weights. A high dimensional vector space is defined, with one dimension for each trigram. Orthogonal unit vectors are defined for each trigram. Each string (e.g. merchant name) to be compared is given a vector in the trigram vector space. This vector is defined as the sum of the unit vectors for each trigram in the string, weighted by the trigram weight. Any two strings, such as merchant names, can now be compared by taking their dot product. If the dot product is above a threshold (determined from analysis of the data set), then the strings are deemed to be equivalents of each other. Normalizing the length of the string vectors may be used to make the comparison insensitive to the length of the original strings. With either partial (normalization of one string but not the other) or non-normalization, string length influences the comparison, but may be used to match parts of one string against the entirety of another string. This methodology provides for an extremely fast and accurate mechanism for string matching. The matching process may be used to determine, for example, whether two merchant names are the same, two company names, two people names, or the like. This is useful in applications needing to reconcile divergent sources or types of data containing strings which reference to a common group of entities (e.g. transaction records from many transaction sources containing names of merchants).

The present invention may be embodied in various forms. As a computer program product, the present invention includes a data preprocessing module that takes consumer spending data and processes it into organized files of account related and time organized purchases. Processing of merchant names in the spending data is provided to normalize variant names of individual merchants. A data post processing module generates consumer profiles of summary statistics in selected time intervals, for use in training the predictive model. A predictive model generation system creates merchant vectors, and clusters them into merchant clusters, and trains the predictive model of each merchant segment using the consumer profiles and transaction data. Merchant vectors, and consumer profiles are stored in databases. A profiling engine applies consumer profiles and consumer transaction data to the predictive models to provide predicted spending in each merchant segment, and to compute membership functions of the consumers for the merchant segment. A reporting engine outputs reports in various formats regarding the predicted spending and membership information. A segment transition detection engine computes changes in each consumer's membership values to identify significant transitions of the consumer between merchant clusters. The present invention may also be embodied as a system, with the above program product element cooperating with computer hardware components, and as a computer implemented method.

DESCRIPTION OF THE DRAWINGS

FIGS. 1a–1c are illustrations of merchant and consumer vector representations.

FIG. 2 is a sample list of merchant segments.

FIG. 7a is an illustration of the master file data prior to stemming and equivalencing, and FIG. 7b is an illustration of a forward co-occurrence window in this portion of the master file after stemming and equivalencing.

DETAILED DESCRIPTION OF THE PREFERRED EMBODIMENTS

Figure 3:
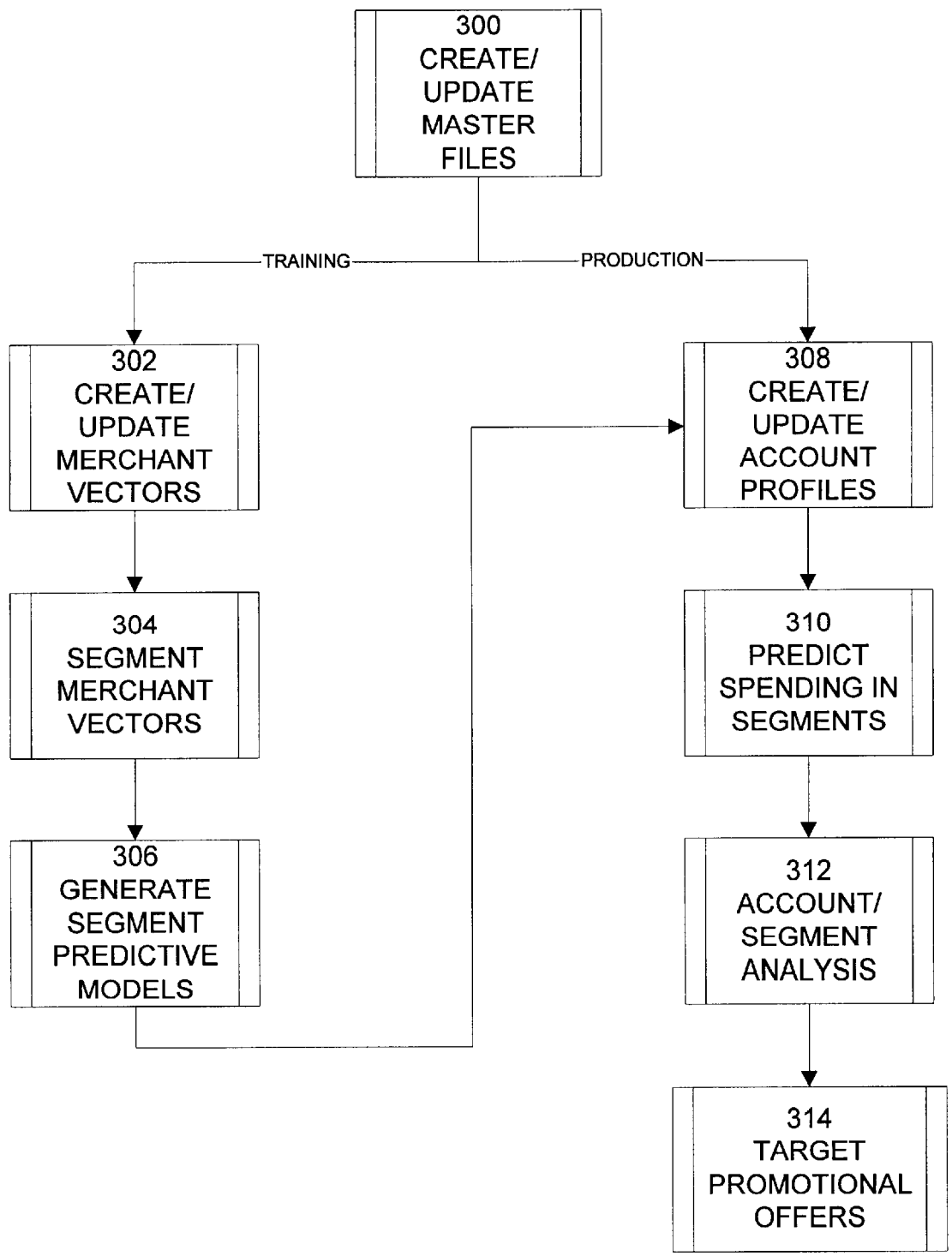
FIG. 3 is a flowchart of the overall process of the present invention.

A. Overview of Consumer and Merchant Vector Representation and the Co-occurrence of Merchant Purchases
B. System Overview
C. Functional Overview
D. Data Preprocessing Module
E. Predictive Model Generation System
   1. Merchant Vector Generation
   2. Training of Merchant Vectors: The UDL Algorithm
      a) Co-occurrence Counting
         i) Forward co-occurrence counting
         ii) Backward co-occurrence counting
         iii) Bi-directional co-occurrence counting
      b) Estimating Expected Co-occurrence Counts
      c) Desired Dot-Products between Merchant Vectors
      d) Merchant Vector Training
   3. Clustering Module
F. Data Postprocessing Module
G. Predictive Model Generation
H. Profiling Engine
   1. Membership Function: Predicted Spending In Each Segment
   2. Segment Membership Based on Consumer Vectors
   3. Updating of Consumer Profiles
I. Reporting Engine
   1. Basic Reporting Functionality
   2. General Segment Report
      a) General Segment Information
      b) Segment Members Information
      c) Lift Chart
      d) Population Statistics Tables
         i) Segment Statistics
         ii) Row Descriptions
J. Targeting Engine
K. Segment Transition Detection A. Overview of Consumer and Merchant Vector Representation and the Co-ocurrence of Merchant Purchases One feature of the present invention that enables prediction of consumer spending levels at specific merchants is the ability to represent both consumer and merchants in a same modeling representation. A conventional example is attempting to classify both consumers and merchants with demographic labels (e.g. "baby boomers", or "empty-nesters"). This conventional approach is simply arbitrary, and does not provide any mechanisms for directly quantifying how similar a consumer is to various merchants. The present invention, however, does provide such a quantifiable analysis, based on high-dimensional vector representations of both consumers and merchants, and the co-occurrence of merchants in the spending data of individual consumers.

Referring now to FIGS. 1a and 1b, there is shown a simplified model of the vector space representation of merchants and consumers. The vector space 100 is shown here with only three axes, but in practice is a high dimensional hypersphere, typically having 100–300 components. In this vector space 100, each merchant is assigned a merchant vector. Preferably, the initial assignment of each merchant's vector contains essentially randomly valued vector components, to provide for a quasi-orthogonal distribution of merchant vectors. This means that initially, the merchant vectors are essentially perpendicular to each other, so that there is no predetermined or assumed association or similarity between merchants.

In FIG. 1a, there is shown merchant vectors for five merchants, A, B, C, D, and E after initialization, and prior to being updated. Merchant A is an upscale clothing store, merchant B is a discount furniture store, merchant C is an upscale furniture store, merchant D is a discount clothing catalog outlet, and merchant E is a online store for fashion jewelry. As shown in FIG. 1c, merchants A and D have the same SIC code because they are both clothing stores, and merchants B and C have the same SIC code because they are both furniture stores. In other words, the SIC codes do not distinguish between the types of consumers who frequent these stores.

In FIG. 1b, there is shown the same vector space 100 after consumer spending data has been processed according to the present invention to train the merchant vectors. The training of merchant vectors is based on co-occurrence of merchants in each consumer's transaction data. FIG. 1c illustrates consumer transaction data 104 for two consumers, C1 and C2. The transaction data for C1 includes transactions 110 at merchants A, C, and E. In this example, the transaction at merchants A and C co-occur within a co-occurrence window 108; likewise the transactions at merchants C and E co-occur within a separate co-occurrence window 108. The transaction data for C2 includes transactions 110 at merchants B and D, which also form a co-occurrence event.

Merchants for whom transactions co-occur in a consumer's spending data have their vectors updated to point more in the same direction in the vector space, that is making their respective vector component values more similar.

Thus, in FIG. 1b, following processing of the consumer transaction data, the merchant vectors for merchants A, C, and E have been updated, based on actual spending data, such as C1's transactions, to point generally in the same direction, as have the merchant vectors for merchants B and D, based on C2's transactions. Clustering techniques are used then to identify clusters or segments of merchants based on their merchant vectors 402. In the example of FIG. 1b, a merchant segment is defined to include merchants A, C, and E, such as "upscale-technology_savvy." Note that as defined above, the SIC codes of these merchants are entirely unrelated, and so SIC code analysis would not reveal this group of merchants. Further, a different segment with merchants B and D is identified, even though the merchants share the same SIC codes with the merchants in the first segment, as shown in the transaction data 104.

Each merchant segment is associated with a merchant segment vector 105, preferably the centroid of the merchant cluster. Based on the types of merchants in the merchant segment, and the consumers who have purchased in the segment, a segment name can be defined, and may express the industry, sub-industry, geography, and/or consumer demographics.

The merchant segments provide very useful information about the consumers. In FIG. 1b there is shown the consumer vectors 106 for consumers C1 and C2. Each consumer's vector is a summary vector of the merchants at which the consumer shops. This summary is preferably the vector sum of merchant vectors at which the consumer has shopped at in defined recent time interval. The vector sum can be weighted by the recency of the purchases, their dollar amount, or other factors.

Being in the same vector space as the merchant vectors, the consumer vectors 106 reveal the consumer's interests in terms of their actual spending behavior. This information is by far a better base upon which to predict consumer spending at merchants than superficial demographic labels or categories. Thus, consumer C1's vector is very strongly aligned with the merchant vectors of merchants A, C, and E, indicating C1 is likely to be interested in the products and services of these merchants. C1's vector can be aligned with these merchants, even if C1 never purchased at any of them before. Thus, merchants A, C, and E have a clear means for identifying consumers who may be interested in purchasing from them.

Which consumers are associated with which merchant segments can also be determined by a membership function. This function can be based entirely on the merchant segment vectors and the consumer vectors (e.g. dot product), or on other quantifiable data, such as amount spent by a consumer in each merchant segment, or a predicted amount to be spent.

Given the consumers who are members of a segment, useful statistics can be generated for the segment, such as average amount spent, spending rate, ratios of how much these consumers spend in the segment compared with the population average, and so forth. This information enables merchants to finely target and promote their products to the appropriate consumers.

FIG. 2 illustrates portions of a sample index of merchant segments, as may be produced by the present invention. Segments are named by assigning each segment a unique segment number 200 between 1 and M the total number of segments. In addition, each segment has a description field 210 which describes the merchant segment. A preferred description field is of the form:

Major Categories: Minor Categories: Demographics: Geography

Major categories 202 describe how the customers in a merchant segment typically use their accounts. Uses include retail purchases, direct marketing purchases, and where this type cannot be determined, then other major categories, such as travel uses, educational uses, services, and the like. Minor categories 204 describe both a subtype of the major category (e.g. subscriptions being a subtype of direct marketing) or the products or services purchased in the transactions (e.g. housewares, sporting goods, furniture) commonly purchased in the segment. Demographics information 206 uses account data from the consumers who frequent this segment to describe the most frequent or average demographic features, such as age range or gender, of the consumers. Geographic information 208 uses the account data to describe the most common geographic location of transactions in the segment. In each portion of the segment description 210 one or more descriptors may be used (i.e. multiple major, minor, demographic, or geographic descriptors). This naming convention is much more powerful and fine-grained than conventional SIC classifications, and provides insights into not just the industries of different merchants (as in SIC) but more importantly, into the geographic, approximate age or gender, and lifestyle choices of consumers in each segment.

The various types of segment reports are further described in section I. Reporting Engine, below.

B. System Overview

Figure 4A:
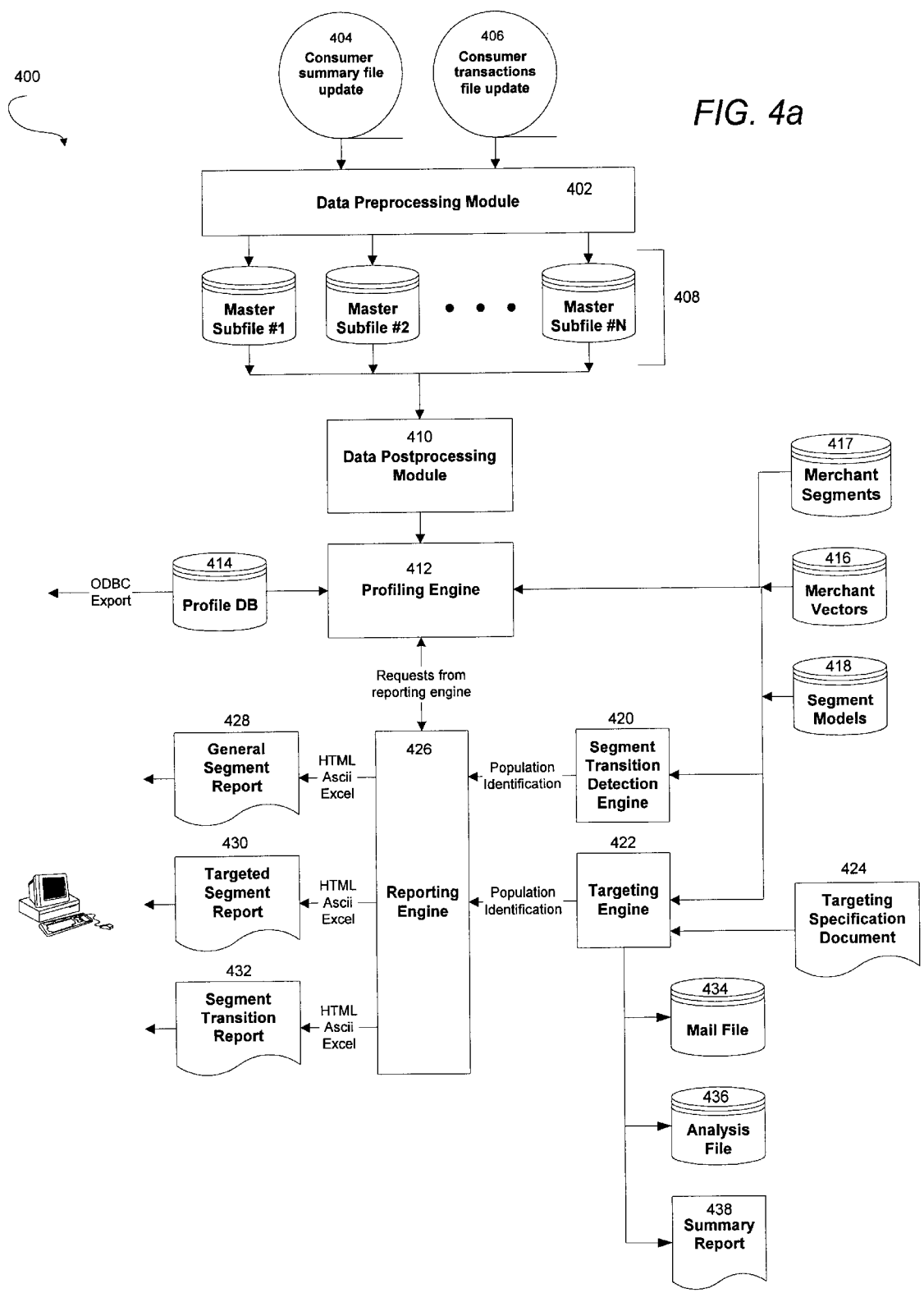
FIG. 4a is an illustration of the system architecture of one embodiment of the present invention during operation.

Turning now to FIG. 4a there is shown an illustration of a system architecture of one embodiment of the present invention during operation in a mode for predicting consumer spending. System 400 includes begins with a data preprocessing module 402, a data postprocessing module 410, a profiling engine 412, and a reporting engine 426. Optional elements include a segment transition detection engine 420 and a targeting engine 422. System 400 operates on different types of data as inputs, including consumer summary file 404 and consumer transaction file 406, generates interim models and data, including the consumer profiles in profile database 414, merchant vectors 416, merchant segment predictive models 418, and produces various useful outputs including various segment reports 428–432.

Figure 4B:
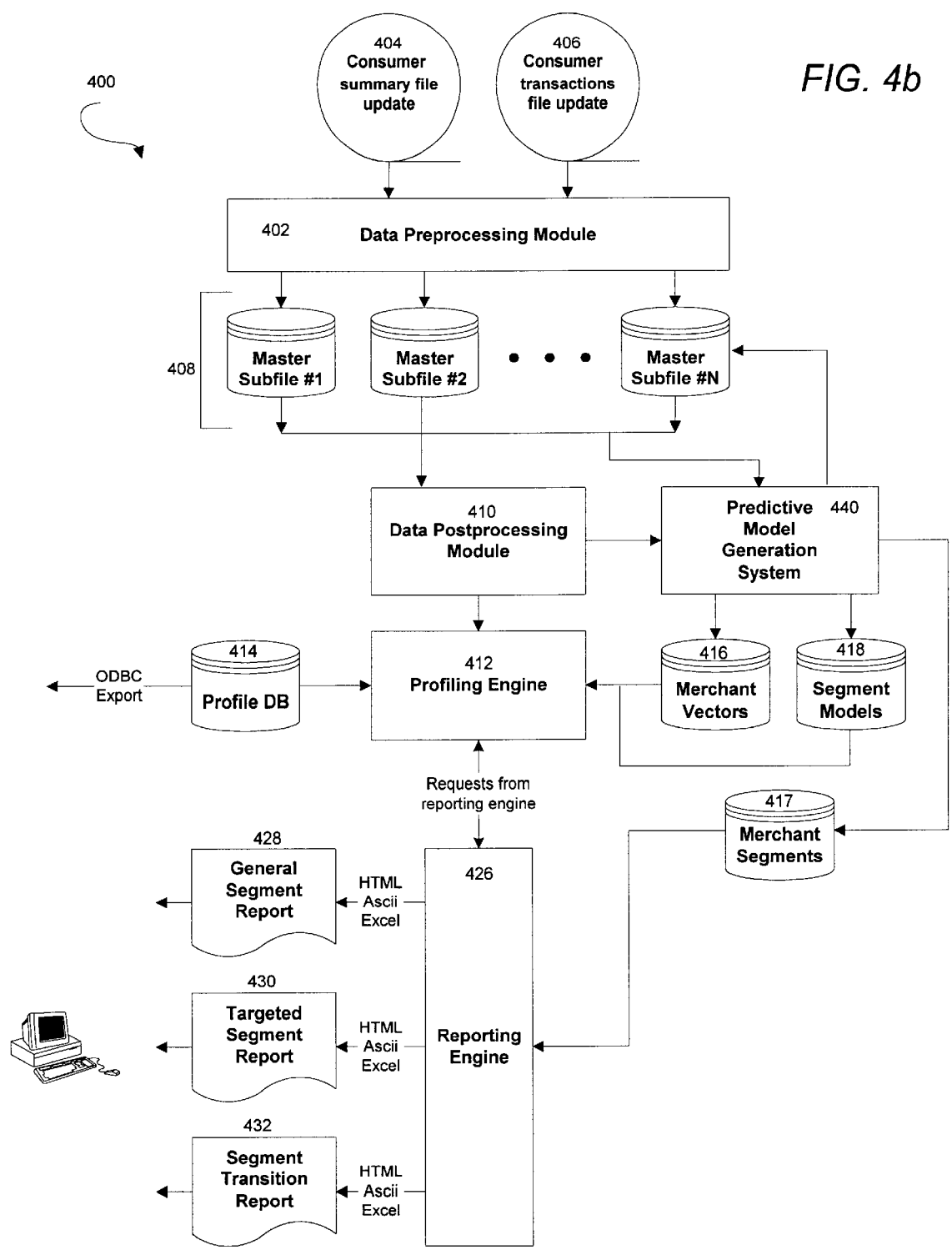
FIG. 4b is an illustration of the system architecture of the present invention during development and training of merchant vectors, and merchant segment predictive models.

FIG. 4b illustrates system 400 during operation in a training mode, and here additionally include predictive model generation system 440.

C. Functional Overview

Referring now to FIG. 3, there is shown a functional overview of the processes supported by the present invention. The process flow illustrated and described here is exemplary of how the present invention may be used, but does not limit the present invention to this exact process flow, as variants may be easily devised.

Generally then, master files 408 are created or updated 300 from account transaction data for a large collection of consumers (account holders) of a financial institution, as may be stored in the consumer summary files 404 and the consumer transaction files 406. The master files 408 collect and organize the transactions of each consumer from different statement periods into a date ordered sequence of transaction data for each consumer. Processing of the master files 408 normalizes merchant names in the transaction data, and generates frequency statistics on the frequency of occurrence of merchant names.

In a training mode, the present invention creates or updates 302 merchant vectors associated with the merchant names. The merchant vectors are based on the co-occurrence of merchants names in defined co-occurrence windows (such as a number of transactions or period of time). Co-occurrence statistics are used to derive measures of how closely related any two merchants are based on their frequencies of co-occurrence with each other, and with other merchants. The relationship measures in turn influence the positioning of merchant vectors in the vector space so that merchants who frequently co-occur have vectors which are similarly oriented in the vector space, and the degree of similarity of the merchant vectors is a function of their co-occurrence rate.

The merchant vectors are then clustered 304 into merchant segments. The merchant segments generally describe groups of merchants which are naturally (in the data)

shopped at "together" based on the transactions of the many consumers. Each merchant segment has a segment vector computed for it, which is a summary (e.g. centroid) of the merchant vectors in the merchant segment. Merchant segments provide very rich information about the merchants that are members of the segments, including statistics on rates and volumes of transactions, purchases, and the like.

With the merchant segments now defined, a predictive model of spending behavior is created 306 for each merchant segment. The predictive model for each segment is derived from observations of consumer transactions in two time periods: an input time window and a subsequent prediction time window. Data from transactions in the input time window for each consumer (including both segment specific and cross-segment) is used to extract independent variables, and actual spending in the prediction window provides the dependent variable. The independent variables typically describe the rate, frequency, and monetary amounts of spending in all segments and in the segment being modeled. A consumer vector derived from the consumer's transactions may also be used. Validation and analysis of the segment predictive models may done to confirm the performance of the models.

In the production phase, the system is used to predict spending, either in future time periods for which there is no actual data as of yet, or in a recent past time period for which data is available and which is used for retrospective analysis. Generally, each account (or consumer) has a profile summarizing the transactional behavior of the account holder. This information is created, or updated 308 with recent transaction data if present, to generate the appropriate variables for input into the predictive models for the segments. (Generation of the independent variables for model generation may also involve updating 308 of account profiles.)

Each account further includes a consumer vector which is derived, e.g. as a summary vector, from the merchant vectors of the merchant at which the consumer has purchased in a defined time period, say the last three months. Each merchant vector's contribution to the consumer vector can be weighted by the consumer's transactions at the merchants, such as by transaction amounts, rates, or recency. The consumer vectors, in conjunction with the merchant segment vectors provide an initial level of predictive power. Each consumer can now be associated with the merchant segment having a merchant segment vector closest to the consumer vector for the consumer.

Using the updated account profiles, this data is input into the set of predictive models to generate 310 for each consumer, an amount of predicted spending in each merchant segment in a desired prediction time period. For example, the predictive models may be trained on a six month input window to predict spending in a subsequent three month prediction window. The predicted period may be an actual future period or a current (e.g. recently ended) period for which actual spending is available.

The predicted spending levels and consumer profiles allow for various levels and types of account and segment analysis 312. First, each account may be analyzed to determine which segment (or segments) the account is a member of, based on various membership functions. A preferred membership function is the predicted spending value, so that each consumer is a member of the segment for which they have the highest predicted spending. Other measures of association between accounts and segments may be based on percentile rankings of each consumer's predicted spending across the various merchant segments. With any of these (or similar) methods of determining which consumers are associated with which segments, an analysis of the rates and volumes of different types of transactions by consumers in each segment can be generated. Further, targeting of accounts in one or more segments may be used to selectively identify populations of consumers with predicted high dollar amount or transaction rates. Account analysis also identifies consumers who have transitioned between segments as indicated by increased or decreased membership values.

Using targeting criteria, promotions directed 314 to specific consumers in specific segments and the merchants in those segments can be realized. For example, given a merchant segment, the consumers with the highest levels (or rankings) of predicted spending in the segment may be identified, or the consumers having consumer vectors closest to the segment vector may be selected. Or, the consumers who have highest levels of increased membership in a segment may be selected. The merchants which make up the segment are known from the segment clustering 304. One or more promotional offers specific to merchants in the segment can be created, such as discounts, incentives and the like. The merchant-specific promotional offers are then directed to the selected consumers. Since these account holders have been identified as having the greatest likelihood of spending in the segment, the promotional offers beneficially coincide with their predicted spending behavior. This desirably results in an increase success rate at which the promotional offers are redeemed.

These and other uses and applications of the present invention will be apparent to those of skill in the art.

D. Data Preprocessing Module

The data preprocessing module 402 (DPM) does initial processing of consumer data received from a source of consumer accounts and transactions, such as a credit card issuer, in preparation for creating the merchant vectors, consumer vectors, and merchant segment predictive models. DPM 402 is used in both production and training modes. (In this disclosure, the terms "consumer," "customer," and "account holder" are used interchangeably).

The inputs for the DPM are the consumer summary file 404 and the consumer transaction file 406. Generally, the consumer summary file 404 provides account data on each consumer who transaction data is to be processed, such as account number and other account identifying and descriptive information. The consumer transaction file 406 provides details of each consumer's transactions. The DPM 402 processes these files to organize both sets of data by account identifiers of the consumer accounts, and merges the data files so that each consumer's summary data is available with their transactions.

Customer summary file 404: The customer summary file 404 contains one record for each customer that is profiled by the system, and includes account information of the customer's account, and optionally includes demographic information about the customer. The consumer summary file 404 is typically one that a financial institution, such as a bank, credit card issuer, department store, and the like maintains on each consumer. The customer or the financial institution may supply the additional demographic fields which are deemed to be of informational or of predictive value. Examples of demographic fields include age, gender and income; other demographic fields may be provided, as desired by the financial institution.

Table 1 describes one set of fields for the customer summary file 404 for a preferred embodiment. Most fields are self-explanatory. The only required field is an account identifier that uniquely identifies each consumer account and transactions. This account identifier may be the same as the consumer's account number; however, it is preferable to have a different identifier used, since a consumer may have multiple account relationships with the financial institution (e.g. multiple credit cards or bank accounts), and all transactions of the consumer should be dealt with together. The account identifier is preferably derived from the account number, such as by a one-way hash or encrypted value, such that each account identifier is uniquely associated with an account number. The pop_id field is optionally used to segment the population of customers into arbitrary distinct populations as specified by the financial institution, for example by payment history, account type, geographic region, etc.

TABLE 1

Customer Summary File

| Description | Sample Format |
|---|---|
| Account_id | Char[max 24] |
| Pop_id | Char ('1'–'N') |
| Account number | Char[max 16] |
| Credit bureau score | Short int as string |
| Internal credit risk score | Short int as string |
| Ytd purchases | Int as string |
| Ytd_cash adv | Int as string |
| Ytd_int purchases | Int as string |
| Ytd int cash adv | Int as string |
| State code | Char[max 2] |
| Zip_code | Char[max 5] |
| Demographic 1 | Int as string |
| . | |
| . | |
| . | |
| Demographic N | Int as string |

Note the additional, optional demographic fields for containing demographic information about each consumer. In addition to demographic information, various summary statistics of the consumer's account may be included. These include any of the following:

TABLE 2

Example Demographic Fields for Customer Summary File

| Description | Explanation |
|---|---|
| Cardholder zip code | |
| Months on books or open date | |
| Number of people on the account | Equivalent to number of plastics |
| Credit risk score | |
| Cycles delinquent | |
| Credit line | |
| Open to buy | |
| Initial month statement balance | Balance on the account prior to the first month of transaction data pull |
| Last month statement balance | Balance on the account at the end of the transaction data pulled |
| Monthly payment amount | For each month of transaction data contributed or the average over last year. |
| Monthly cash advance amount | For each month of transaction data contributed or the average over last year. |
| Monthly cash advance count | For each month of transaction data contributed or the average over last year. |
| Monthly purchase amount | For each month of transaction data contributed or the average over last year. |
| Monthly purchase count | For each month of transaction data contributed or the average over last year. |

TABLE 2-continued

Example Demographic Fields for Customer Summary File

| Description | Explanation |
|---|---|
| Monthly cash advance interest | For each month of transaction data contributed or the average over last year. |
| Monthly purchase interest | For each month of transaction data contributed or the average over last year. |
| Monthly late charge | For each month of transaction data contributed or the average over last year. |

Consumer transaction file 406. The consumer transaction file 406 contains transaction level data for the consumers in the consumer summary file. The shared key is the account_id. In a preferred embodiment, the transaction file has the following description.

TABLE 3

Consumer Transaction File

| Description | Sample Format |
|---|---|
| Account_id | Quoted char(24) - [0–9] |
| Account_number | Quoted char(16) - [0–9] |
| Pop_id | Quoted char(1) - [0–128] |
| Transaction code | Integer |
| Transaction_amount | Float |
| Transaction_time | HH:MM:SS |
| Transaction_date | YYYYMMDD |
| Transaction type | Char(5) |
| SIC code | Char(5)- [0–9] |
| Merchant descriptor | Char(25) |
| SKU Number | Variable length list |
| Merchant zip code | Char[max 5] |

The SKU and merchant zip code data are optional, and may be used for more fine-grained filtering of which transactions are considered as co-occurring.

The output for the DPM is the collection of master files 408 containing a merged file of the account information and transaction information for each consumer. The master file is generated as a preprocessing step before inputting data to the profiling engine 412. The master file 408 is essentially the customer summary file 404 with the consumer's transactions appended to the end of each consumer's account record. Hence the master file has variable length records. The master files 408 are preferably stored in a database format allowing for SQL querying. There is one record per account identifier.

In a preferred embodiment, the master files 408 have the following information:

TABLE 4

Master File 408

| Description | Sample Format |
|---|---|
| Account id | Char[max 24] |
| Pop_id | Char ('1'–'N') |
| Account number | Char[max 16] |
| Credit bureau score | Short int as string |
| Ytd purchases | Int as string |
| Ytd_cash_advances | Int as string |
| Ytd_interest on purchases | Int as string |
| Ytd_interest on cash advs | Int as string |
| State_code | Char[max 2] |

TABLE 4-continued

Master File 408

| Description | Sample Format |
|---|---|
| Demographic_1 | Int as string |
| . | |
| . | |
| . | |
| Demographic N <transactions> | Int as string |

The transactions included for each consumer include the various data fields described above, and any other per-transaction optional data that the financial institution desires to track.

The master file 408 preferably includes a header that indicates last update and number of updates. The master file may be incrementally updated with new customers and new transactions for existing customers. The master file database is preferably be updated on a monthly basis to capture new transactions by the financial institution's consumers.

The DPM 402 creates the master file 408 from the consumer summary file 404 and consumer transaction file 406 by the following process:

a) Verify minimum data requirements. The DPM 402 determines the number of data files it is handling (since there maybe many physical media sources), and the length of the files to determine the number of accounts and transactions. Preferably, a minimum of 12 months of transactions for a minimum of 2 million accounts are used to provide fully robust models of merchants and segments. However, there is no formal lower bound to the amount of data on which system 400 may operate.

b) Data cleaning. The DPM 402 verifies valid data fields, and discards invalid records. Invalid records are records that are missing the any of the required fields for the customer summary file of the transaction file. The DPM 402 also indicates missing values for fields that have corrupt or missing data and are optional. Duplicate transactions are eliminated using account ID, account number, transaction code, transaction amount, date, and merchant description as a key.

c) Sort and merge files. The consumer summary file 404 and the consumer transaction file 406 are both sorted by account ID; the consumer transaction file 406 is further sorted by transaction date. Additional sorting of the transaction file, for example on time, type of transaction, merchant zip code, may be applied to further influence the determination of merchant co-occurrence. The sorted files are merged into the master file 408, with one record per account, as described above.

Due to the large volume of data involved in this stage, compression of the master files 408 is preferred, where on-the-fly compression and decompression is supported. This often improves system performance due to decreased I/O. In addition, as illustrated in FIG. 4a, the master file 408 may be split into multiple subfiles, such as splitting by population ID, or other variable, again to reduce the amount of data being handled at any one time.

E. Predictive Model Generation System

Referring to FIG. 4b, the predictive model generation system 440 takes as its inputs the master file 408 and creates the consumer profiles and consumer vectors, the merchant vectors and merchant segments, and the segment predictive models. This data is used by the profiling engine to generate predictions of future spending by a consumer in each merchant segment using inputs from the data postprocessing module 410.

Figure 5:
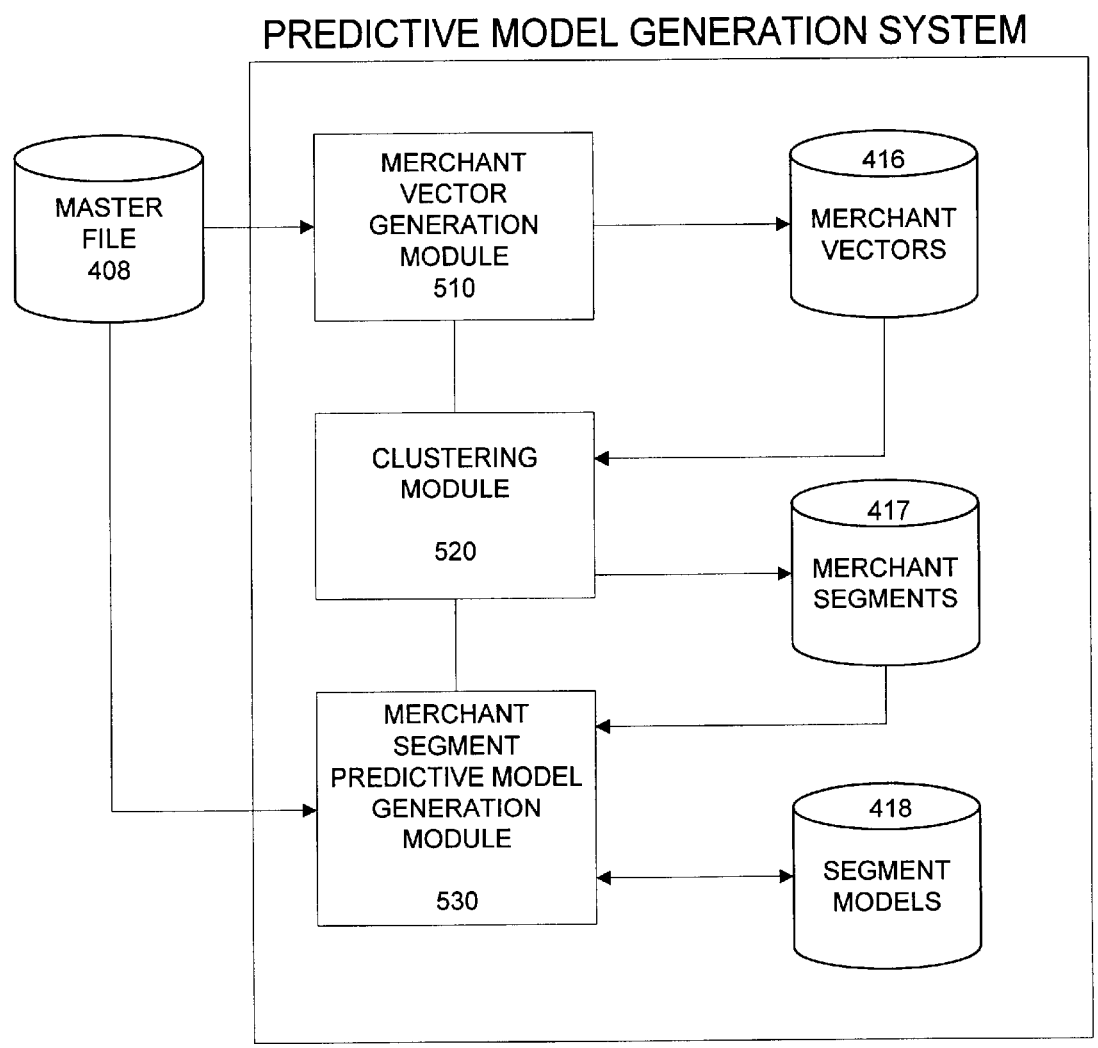
FIG. 5 is an illustration of the functional components of the predictive model generation system.

FIG. 5 illustrates one embodiment of the predictive model generation system 440 that includes three modules: a merchant vector generation module 510, a clustering module 520, and a predictive model generation module 530.

1. Merchant Vector Generation

Merchant vector generation is application of a context vector type analysis to the account data of the consumers, and more particularly to the master files 408. The operations for merchant vector generation are managed by the merchant vector generation module 510.

In order to obtain the initial merchant vectors, additional processing of the master files 408 precedes the analysis of which merchants co-occur in the master files 408. There are two, sequential, processes that are used on the merchant descriptions, stemming and equivalencing. These operations normalize variations of individual merchants names to a single common merchant name to allow for consistent identification of transaction at the merchant. This processing is managed by the vector generation module 510.

Stemming is the process of removing extraneous characters from the merchant descriptions. Examples of extraneous characters include punctuation and trailing numbers. Trailing numbers are removed because they usually indicate the particular store in a large chain (e.g. Wal-Mart #12345). It is preferable to identify all the outlets of a particular chain of stores as a single merchant description. Stemming optionally converts all letters to lower case, and replaces all space characters with a dash. This causes all merchant descriptions to be an unbroken string of non-space characters. The lower case constraint has the advantage of making it easy to distinguish non-stemmed merchant descriptions from stemmed descriptions.

Equivalencing is applied after stemming, and identifies various different spellings of a particular merchant's description as being associated with a single merchant description. For example, the "Roto-Rooter" company may occur in the transaction data with the following three stemmed merchant descriptions: "ROTO-ROOTER-SEWER-SERV", "ROTO-ROOTER-SERVICE", and "ROTO-ROOTER-SEWER-DR". An equivalence table is set up containing a root name and a list of all equivalent names. In this example, ROTO-ROOTER-SEWER-SERV becomes the root name, and the latter two of these descriptions are listed as equivalents. During operation, such as generation of subsequent master files 408 (e.g. the next monthly update), an identified equivalenced name is replaced with its root name from the equivalence table.

In one embodiment, equivalencing proceeds in two steps, with an optional third step. The first equivalencing step uses a fuzzy trigram matching algorithm that attempts to find merchant descriptions with nearly identical spellings. This method collects statistics on all the trigrams (sets of three consecutive letters in a word) in all the merchant descriptions, and maintains a list of the trigrams in each merchant description. The method then determines a closeness score for any two merchant names that are supplied for comparison, based on the number of trigrams the merchant names have in common. If the two merchant names are scored as being sufficiently close, they are equivalenced. Appendix I, below, provides a novel trigram matching algorithm useful for equivalencing merchant names (and other strings). This algorithm uses a vector representation of each trigram, based on trigram frequency in data set, to construct trigram vectors, and judges closeness based on vector dot products.

Preferably, equivalencing is applied only to merchants that are assigned the same SIC code. This constraint is useful since two merchants may have a similar name, but if they are in different SIC classifications there is a good chance that they are, in fact, different businesses.

The second equivalencing step consists of fixing a group of special cases. These special cases are identified as experience is gained with the particular set of transaction data being processed. There are two broad classes that cover most of these special cases: a place name is used instead of a number to identify specific outlets in a chain of stores, and some department stores append the name of the specific department to the name of the chain. An example of the first case is U-Haul, where stemmed descriptions look like U-HAUL-SAN-DIEGO, U-HAUL-ATLANTA, and the like. An example of the second case is Robinsons-May department stores, with stemmed descriptions like ROBINSONMAY-LEE-WOMEN, ROBINSONMAY-LEVI-SHORT, ROBINSONMAY-TRIFARI-CO, and ROBINSONMAY-JANE-ASHLE. In both cases, any merchant description in the correct SIC codes that contain the root name (e.g. U-HAUL or ROBINSONMAY) are equivalenced to the root name.

A third, optional step includes a manual inspection and correction of the descriptions for the highest frequency merchants. The number of merchants subjected to this inspection varies, depending upon the time constraints in the processing stream. This step catches the cases that are not amenable to the two previous steps. An example is Microsoft Network, with merchant descriptions like MICROSOFT-NET and MSN-BILLING. With enough examples from the transaction data, these merchant descriptors can also be added to the special cases in step two, above.

Preferably, at least one set of master files 408 is generated before the equivalencing is determined. This is desirable in order to compile statistics on frequencies of each merchant description within each SIC code before the equivalencing is started.

Once the equivalencing table is constructed, the original master files 408 are re-built using the equivalenced merchant descriptions. This steps replaces all equivalenced merchant descriptors with their associated root names, thereby ensuring that all transactions for the merchant are associated with the same merchant descriptor. Subsequent incoming transaction data can be equivalenced before it is added to the master files, using the original equivalence table.

Given the equivalence table, a merchant descriptor frequency list can be determined describing the frequency of occurrence of each merchant descriptor (including its equivalents).

Once the equivalence table is defined an initial merchant vector is assigned to each root name. The merchant vector training based on co-occurrence is then performed, processing the master files by account ID and then by date as described above.

2. Training of Merchant Vectors: The UDL Algorithm

As noted above, the merchant vectors are based on the co-occurrence of merchants in each consumer's transaction data. The master files 408, which are ordered by account and within account by transaction date, are processed by account, and then in date order to identify groups of co-occurring merchants. The co-occurrence of merchant names (once equivalenced) is the basis of updating the values of the merchant vectors.

The training of merchant vectors is based upon the unexpected deviation of co-occurrences of merchants in transactions. More particularly, an expected rate at which any pair of merchants co-occur in the transaction data is estimated based upon the frequency with which each individual merchant appears in co-occurrence with any other merchants, and a total number of co-occurrence events. The actual number of co-occurrences of a pair of merchants is determined. If a pair of merchants co-occur more frequently then expected, then the merchants are positively related, and the strength of that relationship is a function of the "unexpected" amount of co-occurrence. If the pair of merchants co-occur less frequently then expected, then the merchants are negatively related. If a pair of merchants co-occur in the data about the same as expected, then there is no generally relationship between them. Using the relationship strengths of each pair of merchants as the desired dot product between the merchant vectors, the values of the merchant vectors can be determined in the vector space. This process is the basis of the Unexpected Deviation Learning algorithm or "UDL".

This approach overcomes the problems associated with conventional vector based models of representation, which tend to be based on overall frequencies of terms relative to the database as a whole. Specifically, in a conventional model, the high frequency merchants, that is merchants for which there are many, many purchases, would co-occur with many other merchants, and either falsely suggest that these other merchants are related to the high frequency merchants, or simply be so heavily down-weighted as to have very little influence at all. That is, a high frequency merchant names would be treated as high frequency English words like "the" and "and", and so forth, which are given very low weights in conventional vector systems specifically because of their high frequency.

However, the present invention takes account of the high frequency presence of individual merchants, and instead analyses the expected rate at which merchants, including high frequency merchants, co-occur with other merchants. High frequency merchants are expected to co-occur more frequently. If a high frequency merchant and another merchant co-occur even more frequently than expected, then there is a positive correlation between them. The present invention thus accounts for the high frequency merchants in a manner that conventional methodologies cannot.

The overall process of modeling the merchant vectors using unexpected deviation is as follows:

1. First, count the number of times that the merchants co-occur with one another in the transaction data. The intuition is that related merchants occur together often, whereas unrelated merchants do not occur together often.
2. Next, calculate the relationship strength between merchants based on how much the observed co-occurrence deviated from the expected co-occurrence. The relationship strength has the following characteristics:

Two merchants that co-occur significantly more often than expected are positively related to one another.

Two merchants that co-occur significantly less often than expected are negatively related to one another.

Two merchants that co-occur about the number of times expected are not related.
3. Map the relationship strength onto vector space; that is, determine the desired dot product between the merchant vectors for all pairs of items given their relationship strength. The mapping results in the following characteristics:

The merchant vectors for positively related merchants have a positive dot product.

The merchant vectors for negatively related merchants have a negative dot product.

The merchant vectors for unrelated merchants have a zero dot product.
4. Update the merchant vectors from their initial assignments, so that the dot products between them at least closely approximate the desired dot products.

The next sections explain this process in further detail.

a) Co-occurrence Counting

Co-occurrence counting is the procedure of counting the number of times that two items, here merchant descriptions, co-occur within a fixed size co-occurrence window in some set of data, here the transactions of the consumers. Counting can be done forwards, backwards, or bi-directionally. The best way to illustrate co-occurrence counting is to give an example for each type of co-occurrence count:

Example: Consider the sequence of merchant names:

M1 M3 M1 M3 M3 M2 M3 where M1, M2 and M3 stands for arbitrary merchant names as they might appear in a sequence of transactions by a consumer. For the purposes of this example, intervening data, such dates of transactions, amounts, transaction identifiers, and the like, are ignored. Further assume a co-occurrence window with a size=3. Here, the co-occurrence window is based on a simple count of items or transactions, and thus the co-occurrence window represents a group of three transactions in sequence.

i) Forward Co-occurrence Counting

Figure 6A:
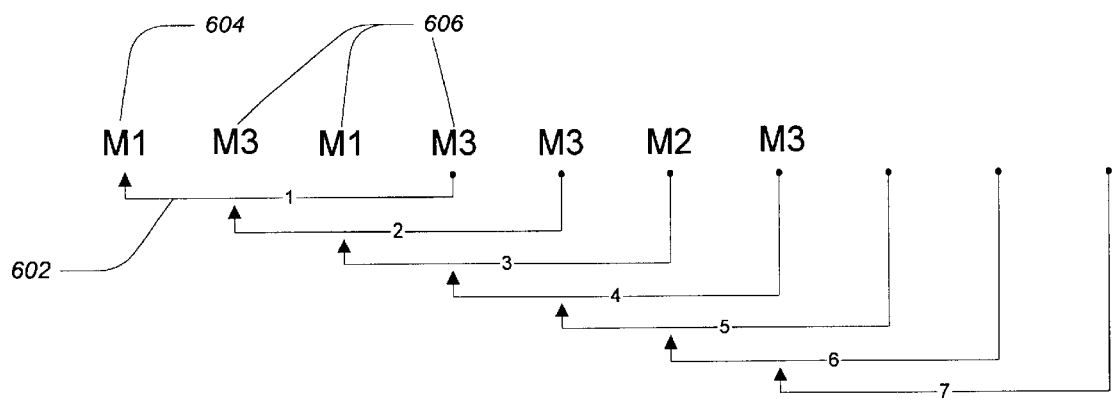
FIGS. 6a and 6b are illustrations of forward and backward co-occurrence windows.

The first step in the counting process is to set up the forward co-occurrence windows. FIG. 6a illustrates the co-occurrence windows 602 for forward co-occurrence counting of this sequence of merchant names. By definition, each merchant name is a target 604, indicated by an arrow, for one and only one co-occurrence window 602. Therefore, in this example there are seven forward co-occurrence windows 602, labeled 1 through 7. The other merchant names within a given co-occurrence window 602 are called the neighbors 606. In forward co-occurrence counting, the neighbors occur after the target. For window size=3 there can be at most three neighbors 606 within a given co-occurrence window 602. Obviously, the larger the window size, the more merchants (and transactions) are deemed to co-occur at a time.

The next step is to build a table containing all co-occurrence events. A co-occurrence event is simply a pairing of a target 604 with a neighbor 606. For the co-occurrence window #1 in FIG. 6a, the target is M1 and the neighbors are M3, M1, and M3. Therefore, the co-occurrence events in this window are: (M1, M3), (M1, M1), and (M1, M3). Table 5 contains the complete listing of co-occurrence events for every co-occurrence window in this example.

TABLE 5

Forward co-occurrence event table

| Co-occurrence Window | Target | Neighbor |
|---|---|---|
| 1 | M1 | M3 |
| 1 | M1 | M1 |
| 1 | M1 | M3 |
| 2 | M3 | M1 |
| 2 | M3 | M3 |
| 2 | M3 | M3 |
| 3 | M1 | M3 |
| 3 | M1 | M3 |
| 3 | M1 | M2 |
| 4 | M3 | M3 |
| 4 | M3 | M2 |
| 4 | M3 | M3 |
| 5 | M3 | M2 |
| 5 | M3 | M3 |
| 6 | M2 | M3 |

The last step is to tabulate the number of times that each unique co-occurrence event occurred. A unique co-occurrence event is the combination (in any order) of two merchant names. Table 6 shows this tabulation in matrix form. The rows indicate the targets and the columns indicate the neighbors. For future reference, this matrix will be called the forward co-occurrence matrix.

TABLE 6

Forward Co-occurrence matrix

| Target | Neighbor | | | |
|---|---|---|---|---|
| | M1 | M2 | M3 | |
| M1 | 1 | 1 | 4 | 6 |
| M2 | 0 | 0 | 1 | 1 |
| M3 | 1 | 2 | 5 | 8 |
| | 2 | 3 | 10 | 15 | ii) Backward Co-occurrence Counting

Figure 6B:
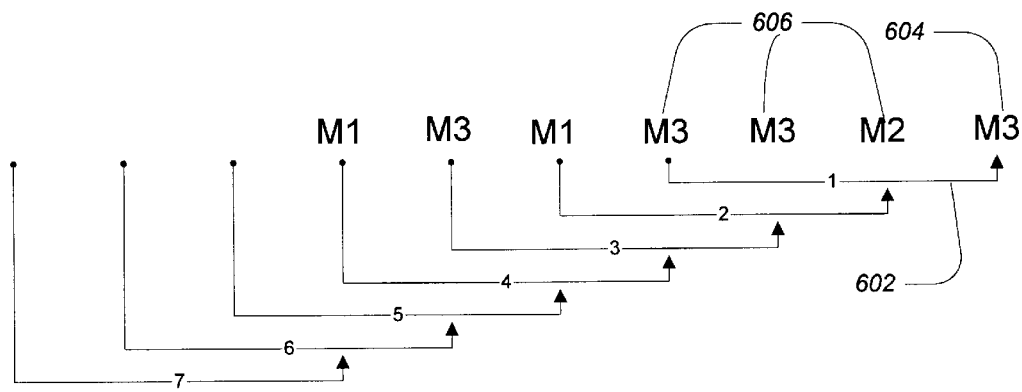

Backward co-occurrence counting is done in the same manner as forward co-occurrence counting except that the neighbors precede the target in the co-occurrence windows. FIG. 6b illustrates the co-occurrence windows for the same sequence of merchant names for backward co-occurrence counting.

Once the co-occurrence windows are specified, the co-occurrence events can be identified and counted.

TABLE 7

Backward co-occurrence event table

| Co-occurrence Window | Target | Neighbor |
|---|---|---|
| 1 | M3 | M2 |
| 1 | M3 | M3 |
| 1 | M3 | M3 |
| 2 | M2 | M3 |
| 2 | M2 | M3 |
| 2 | M2 | M1 |
| 3 | M3 | M3 |
| 3 | M3 | M1 |
| 3 | M3 | M3 |
| 4 | M3 | M1 |
| 4 | M3 | M3 |
| 4 | M3 | M1 |
| 5 | M1 | M3 |
| 5 | M1 | M1 |
| 6 | M3 | M1 |

The number of times that each unique co-occurrence event occurred is then recorded in the backward co-occurrence matrix.

Backward Co-occurrence matrix

| Target | Neighbor | | | |
|---|---|---|---|---|
| | M1 | M2 | M3 | |
| M1 | 1 | 0 | 4 | 2 |
| M2 | 1 | 0 | 2 | 3 |
| M3 | 4 | 1 | 5 | 10 |
| | 6 | 1 | 8 | 15 |

Note that the forward co-occurrence matrix and the backward co-occurrence matrix are the transpose of one another. This relationship is intuitive, because backward co-occurrence counting is the same as forward co-occurrence counting with the transaction stream reversed. Thus, there is no need to do both counts; either count can be used, and then the transpose the resulting co-occurrence matrix taken to obtain get the other.

iii) Bi-directional Co-occurrence Counting

The bi-directional co-occurrence matrix is just the sum of the forward co-occurrence matrix and the backward co-occurrence matrix. The resulting matrix will always be symmetric. In other words, the co-occurrence between merchant names A and B is the same as the co-occurrence between merchant names B and A. This property is desirable because this same symmetry is inherent in vector space; that is for merchant vectors $\vec{V}_A$ and $\vec{V}_B$ for merchants A and B, $\vec{V}_A \cdot \vec{V}_B = \vec{V}_B \cdot \vec{V}_A$. For this reason, the preferred embodiment uses the bi-directional co-occurrence matrix.

| | Bi-directional Co-occurrence matrix | | | |
|---|---|---|---|---|
| | | Neighbor | | |
| Target | M1 | M2 | M3 | |
| M1 | 2 | 1 | 5 | 8 |
| M2 | 1 | 0 | 3 | 4 |
| M3 | 5 | 3 | 10 | 18 |
| | 8 | 4 | 18 | 30 |

FIGS. 7a and 7b illustrate the above concepts in the context of consumer transaction data in the master files 408. In FIG. 7a there is shown a portion of the master file 408 containing transactions of a particular customer. This data is prior to the stemming and equivalencing steps described above, and so includes the original names of the merchants with spaces, store numbers and locations and other extraneous data.

FIG. 7b illustrates the same data after stemming and equivalencing. Notice that the two transactions at STAPLES which previously identified a store number are now equivalenced. The two car rental transactions at ALAMO which transactions previously included the location are equivalenced to ALAMO, as are two hotel stays at HILTON which also previously included the hotel location. Further note that the HILTON transactions specified the location prior to the hotel name. Finally, the two transactions at NORDSTROMS which previously identified a department have been equivalenced to the store name itself.

Further, a single forward co-occurrence window 700 is shown with the target 702 being the first transaction at the HILTON, and the next three transactions being neighbors 704.

Accordingly, following the updating of the master files 408 with the stemmed and equivalenced names, the merchant vector generation module 510 performs the following steps for each consumer account:

1. Read the transaction data in date order.
2. Forward count the co-occurrences of merchant names in the transaction data, using a predetermined co-occurrence window.
3. Generate the forward co-occurrence, backward co-occurrence and bi-directional co-occurrence matrixes.

One preferred embodiment uses a co-occurrence window size of three transactions. This captures the transactions as the co-occurring events (and not the presence of merchant names within three words of each other) based only on sequence. In an alternate embodiment the co-occurrence window is time-based using a date range in order to identify co-occurring events. For example, with a co-occurrence window of 1 week, given a target transaction, a co-occurring neighbor transaction occurs within one week of the target transaction. Yet another date approach is to define the target not as a transaction, but rather as a target time period, and then the co-occurrence window as another time period. For example, the target period can be a three month block and so all transactions within the block are the targets, and then the co-occurrence window may be all transactions in the two months following the target period. Thus, each merchant having a transaction in the target period co-occurs with each merchant (same or other) having a transaction in the co-occurrence period. Those of skill in the art can readily devise alternate co-occurrence definitions which capture the sequence and/or time related principles of co-occurrence in accordance with the present invention.

b) Estimating Expected Co-occurrence Counts

In order to determine whether two merchants are related, the UDL algorithm uses an estimate about the number of times transactions at such merchants would be expected to occur. Suppose the only information known about transaction data is the number of times that each merchant name appeared in co-occurrence events. Given no additional information, the correlation between any two merchant names, that is how strongly they are related, cannot be determined. In other words, we would be unable to determine whether the occurrence of a transaction at one merchant increases or decreases the likelihood of occurrence of a transaction at another merchant.

Now suppose that it is desired predict the number of times two arbitrary merchants, merchant$_i$ and merchant$_j$ co-occur. In the absence of any additional information we would have to assume that merchant$_i$ and merchant$_j$, are not correlated. In terms of probability theory, this means that the occurrence of a transaction at merchant$_i$ will not affect the probability of the occurrence of a transaction at merchant$_j$:

$$P_{j|i} = P_j \quad [1]$$

The joint probability of merchant$_i$ and merchant$_j$ is given by $$P_{ij} = P_i P_{j|i} \quad [2]$$

Substituting $P_j$ for $P_{j|i}$ into equation [2] gives $$P_{ij} = P_i P_{j|i} = P_i P_j \quad [3]$$

However, the true probabilities $P_i$ and $P_j$, are unknown, and so they must be estimated from the limited information given about the data. In this scenario, the maximum likelihood estimate $\hat{P}$ for $P_i$ and $P_j$ is $$\hat{P}_i = T_i/T \quad [4]$$

$$\hat{P}_j = T_j/T \quad [5]$$

where
- $T_i$ is the number of co-occurrence events that merchant$_i$ appeared in,
- $T_j$ is the number of co-occurrence events that merchant$_j$ appeared in, and
- T is the total number of co-occurrence-events.

These data values are taken from the bi-directional co-occurrence matrix. Substituting these estimates into equation [3] produces $$\hat{P}_{ij}=\hat{P}_i=\hat{P}_j=T_iT_j/T^2 \quad [6]$$

which is the estimate for $P_{ij}$.

Since there are a total of T independent co-occurrence events in the transaction data, the expected number of co-occurring transactions of merchant$_i$ and merchant$_j$ is $$\hat{T}_{ij}=T\hat{P}_{ij}=T_iT_j/T \quad [7]$$

This expected value serves as a reference point for determining the correlation between any two merchants in the transaction data. If two merchants co-occur significantly greater than expected by $\hat{T}_{ij}$, the two merchants are positively related. Similarly, if two merchants co-occur significantly less than expected, the two merchants are negatively related. Otherwise, the two merchants are practically unrelated.

Also, given the joint probability estimate $\hat{P}_{ij}$ and the number of independent co-occurrence events T, the estimated probability distribution function for the number of times that merchant$_i$ and merchant$_j$ co-occur can be determined. It is well known, from probability theory, that an experiment having T independent trials (here transactions) and a probability of success $\hat{P}_{ij}$ for each trial (success here being co-occurrence of merchant$_i$ and merchant$_j$) can be modeled using the binomial distribution. The total number of successes k, which in this case represents the number of co-occurrences of merchants, has the following probability distribution:

$$\Pr(t_{ij}=k|T,T_i,T_j) = \frac{T!}{k!(T-k)!} \cdot \hat{P}_{ij}^k \cdot (1-\hat{P}_{ij})^{T-k} \quad [8]$$

This distribution has mean:

$$E[t_{ij}] = T\hat{P}_{ij} = \frac{T_iT_j}{T} \quad [9]$$

which is the same value as was previously estimated using a different approach. The distribution has variance:

$$\text{Var}[t_{ij}] = T\hat{P}_{ij}(1-\hat{P}_{ij}) = \frac{T_iT_j}{T} \cdot \left(1 - \frac{T_iT_j}{T^2}\right) \quad [10]$$

The variance is used indirectly in UDL1, below. The standard deviation of $t_{ij}$, $\sigma_{ij}$, is the square root of the variance Var[$t_{ij}$]. If merchant$_i$ and merchant$_j$ are not related, the difference between the actual and expected co-occurrence counts, $T_{ij}-\hat{T}_{ij}$, should not be much larger than $\sigma_{ij}$.

c) Desired Dot-Products Between Merchant Vectors

To calculate the desired dot product ($d_{ij}$) between two merchants vectors, the UDL algorithm compares the number of observed co-occurrences (found in the bidirectional co-occurrence matrix) to the number of expected co-occurrences. First, it calculates a raw relationship measure ($r_{ij}$) from the co-occurrence counts, and then it calculates a desired dot product $d_{ij}$ from $r_{ij}$. There are at least three different ways that the relationship strength and desired dot product can be calculated from the co-occurrence data:

Method: UDL1

$$r_{ij} = \frac{T_{ij} \cdot \hat{T}_{ij}}{\sigma_{ij}} \approx \frac{T_{ij} \cdot \hat{T}_{ij}}{\sqrt{\hat{T}_{ij}}} \quad [11]$$

$$d_{ij} = \tanh\left(\frac{\sigma_0 \cdot r_{ij}}{2\sigma_r}\right) \quad [12]$$

Method: UDL2

$$r_{ij} = \text{sign}(T_{ij} - \hat{T}_{ij}) \cdot \sqrt{2\ln\lambda} \quad [13]$$

$$d_{ij} = \tanh\left(\frac{\sigma_0 \cdot r_{ij}}{2\sigma_r}\right) \quad [12]$$

Method: UDL3

$$r_{ij} = \text{sign}(T_{ij} \cdot \hat{T}_{ij}) \cdot \sqrt{\frac{2\ln\lambda}{\sqrt{\hat{T}_{ij}}}} = \text{sign}(T_{ij} - \hat{T}_{ij}) \cdot \sqrt{2\ln\lambda} \cdot \hat{T}_{ij}^{1/4} \quad [14]$$

$$d_{ij} = \tanh\left(\frac{\sigma_0 \cdot r_{ij}}{2\sigma_r}\right) \quad [12]$$

where $T_{ij}$ is the actual number of co-occurrence events for merchant$_i$ and merchant$_j$, and $\sigma_r$ is the standard deviation of all the $r_{ij}$.

In UDL2 and UDL3, the log-likelihood ratio, $\ln\lambda$ is given by:

$$\ln\lambda = T_{ij}\ln\frac{T_{ij}}{\hat{T}_{ij}} + (T_i - T_{ij})\ln\frac{(T_i - T_{ij})}{(T_i - \hat{T}_{ij})} + \quad [15]$$

$$(T_j - T_{ij})\ln\frac{(T_j - T_{ij})}{(T_j - \hat{T}_{ij})} +$$

$$(T - T_i - T_j + T_{ij})\ln\frac{(T - T_i - T_j + T_{ij})}{(T - T_i - T_j + \hat{T}_{ij})}$$

Each technique calculates the unexpected deviation, that is, the deviation of the actual co-occurrence count from the expected co-occurrence count. In terms of the previously defined variables, the unexpected deviation is:

$$D_{ij}=T_{ij}-\hat{T}_{ij} \quad [16]$$

Thus, $D_{ij}$ may be understood as a raw measure of unexpected deviation.

As each method uses the same unexpected deviation measure, the only difference between each technique is that they use different formulas to calculate $r_{ij}$ from $D_{ij}$. (Note that other calculations of dot product may be used).

The first technique, UDL1, defines $r_{ij}$ to be the unexpected deviation $D_{ij}$ divided by the standard deviation of the predicted co-occurrence count. This formula for the relationship measure is closely related to chi-squared ($\chi^2$), a significance measure commonly used by statisticians. In fact $$\chi^2 = r_{ij}^2 = \frac{(T_{ij} - \hat{T}_{ij})^2}{\sigma_{ij}^2} \quad [17]$$

For small counts situations, i.e. when $\hat{T}_i \ll 1$, UDL1 gives overly large values for $r_{ij}$. For example, In a typical retail transaction data set, which has more than 90% small counts, values of $r_{ij}$ on the order of $10^9$ have been seen. Data sets having such a high percentage of large relationship measures can be problematic; because in these cases, $\sigma_r$ also becomes very large. Since the same $\sigma_r$ is used by all co-occurrence pairs, large values of $\sigma_r$ causes $$\frac{r_{ij}}{\sigma_r}$$

to become very small for pairs that do not suffer from small counts. Therefore in these cases $d_{ij}$ becomes $$d_{ij} = \tanh\left(\frac{\sigma_0 r_{ij}}{2\sigma_r}\right) \approx 0 \qquad [18]$$

This property is not desirable, because it forces the merchant vectors of two merchants too be orthogonal, even when the two merchants co-occur significantly greater than expected.

The second technique, UDL2, overcomes of the small count problem by using log-likelihood ratio estimates to calculate $r_{ij}$. It has been shown that log-likelihood ratios have much better small count behavior than $\chi^2$, while at the same time retaining the same behavior as $\chi^2$ in the non-small count regions.

The third technique, UDL3, is a slightly modified version of UDL2. The only difference is that the log likelihood ratio estimate is scaled by $$\frac{1}{\sqrt{\hat{r}_{ij}}}.$$

This scaling removes the $$\sqrt{\hat{r}_{ij}}$$

bias from the log likelihood ratio estimate. The preferred embodiment uses UDL2 in most cases.

Accordingly, the present invention generally proceeds as follows:

1. For each pair of root merchant names, determine the expected number of co-occurrences of the pair from total number of co-occurrence transactions involving each merchant name (with any merchant) and the total number of co-occurrence transactions.
2. For each pair of root merchant names, determine a relationship strength measure based on the difference between the expected number of co-occurrences and the actual number of co-occurrences.
3. For each pair of root merchant names, determine a desired dot product between the merchant vectors from the relationship strength measure.
d) Merchant Vector Training The goal of vector training is to position the merchant vectors in a high-dimensional vector space such that the dot products between them closely approximates their desired dot products. (In a preferred embodiment, the vector space has 280 dimensions, though more or less could be used). Stated more formally:

Given a set of merchant vectors $V=\{\vec{V}_1, \vec{V}_2, \ldots, \vec{V}_N\}$, and the set of desired dot products for each pair of vectors $D=\{d_{12}, d_{13}, \ldots, d_{1N}, d_{21}, d_{23}, \ldots, d_{2N}, d_{3,1}, \ldots, d_{N(N-1)}\}$, position each merchant vector such that a cost function is minimized, e.g:

$$E = \frac{1}{2} \sum_{i=1, i \neq j}^{N} \sum_{j=i}^{N} (d_{ij} - \vec{V}_i \cdot \vec{V}_j)^2 \qquad [19]$$

In a typical master file 408 of typical transaction data, the set of merchants vectors contains ten thousand or more vectors. This means that if it desired to find the optimal solution, then there must be solved a system of ten thousand or more high-dimensional linear equations. This calculation is normally prohibitive given the types of time frames in which the information is desired. Therefore, alternative techniques for minimizing the cost function are preferred.

One such approach is based on gradient descent. In this technique, the desired dot product is compared to the actual dot product for each pair of merchant vectors. If the dot product between a pair of vectors is less than desired, the two vectors are moved closer together. If the dot product between a pair of vectors is greater than desired, the two vectors are moved farther apart. Written in terms of vector equations, this update rule is:

$$\vec{V}_i(n+1) = \vec{V}_i(n) + \alpha(d_{ij} - \vec{V}_i \cdot \vec{V}_j)\vec{V}_j \qquad [20]$$

$$\vec{V}_i(n+1) = \frac{\vec{V}_i(n+1)}{\|\vec{V}_i(n+1)\|} \qquad [21]$$

$$\vec{V}_j(n+1) = \vec{V}_j(n) + \alpha(d_{ij} - \vec{V}_i \cdot \vec{V}_j)\vec{V}_i \qquad [22]$$

$$\vec{V}_j(n+1) = \frac{\vec{V}_j(n+1)}{\|\vec{V}_j(n+1)\|} \qquad [23]$$

This technique converges as long as the learning rate ($\alpha$) is sufficiently small (and determined by analysis of the particular transaction data being used; typically in the range 0.1–0.5), however the convergence may be very slow.

An alternative methodology uses averages of merchant vectors. In this embodiment, the desired position of a current merchant vector is determined with respect to each other merchant vector given the current position of the other merchant vector, and the desired dot product between the current and other merchant vector. An error weighted average of these desired positions is then calculated, and taken as the final position of the current merchant vector. Written in terms of vector equations, the update rule is:

$$\vec{V}_i(n+1) = (1-\gamma)\vec{V}_i + \gamma \sum_{j=1}^{N} \vec{U}_{ij}(1 - \vec{V}_i \cdot \vec{U}_{ij}) \qquad [24]$$

where $\vec{V}_{ij}(n+1)$ is the updated position of the current merchant vector $\vec{V}_i$, and $\vec{U}_{ij}$ is the desired position of current merchant vector $\vec{V}_i$ with respect to each other merchant vector $\vec{V}_j$. $\vec{U}_{ij}$ may be calculated using formula:

$$\vec{U}_{ij} = \left(\frac{1-d_{ij}^2}{1-\varepsilon_{ij}^2}\right)^{\frac{1}{2}} \vec{V}_i + \left[d_{ij} - \left(\frac{1-d_{ij}^2}{1-\varepsilon_{ij}^2}\right)^{\frac{1}{2}} \varepsilon_{ij}\right]\vec{V}_j \qquad [25]$$

where $d_{ij}$ is the desired dot product between $\vec{V}_i$ and $\vec{V}_j$, and $\varepsilon_{ij}$ is the current dot product between $\vec{V}_i$ and $\vec{V}_j$.

Since $\vec{U}_{ij}$ is a linear combination of merchant vectors $\vec{V}_i$ and $\vec{V}_j$, it will always be in the plane of these vectors $\vec{V}_i$ and $\vec{V}_j$.

The result of any of these various approaches is a final set of merchant vectors for all merchant names.

Appendix II below, provides a geometrically derived algorithm for the error weighted update process. Appendix III provides an algebraically derived algorithm of this process, which results in an efficient code implementation, and which produces the same results as the algorithm of Appendix II.

Those of skill in the art will appreciate that the UDL algorithm, including its variants above, and the implementations in the appendices, may be used in contexts outside of determining merchant co-occurrences. This aspect of the present invention may be for vector representation and co-occurrence analysis in any application domain, for example, where there is need for representing high frequency data items without exclusion. Thus, the UDL algorithm may be used in information retrieval, document routing, and other fields of information analysis.

3. Clustering Module

Following generation and training of the merchant vectors, the clustering module 520 is used to cluster the resulting merchant vectors and identify the merchant segments. Various different clustering algorithms may be used, including k-means clustering (MacQueen). The output of the clustering is a set of merchant segment vectors, each being the centroid of a merchant segment, and a list of merchant vectors (thus merchants) included in the merchant segment.

There are two different clustering approaches that may be usefully employed to generate the merchant segments. First, clustering may be done on the merchant vectors themselves. This approach looks for merchants having merchant vectors which are substantially aligned in the vector space, and clusters these merchants into segments and computes a cluster vector for each segment. Thus, merchants for whom transactions frequently co-occur and have high dot products between their merchant vectors will tend to form merchant segments. Note that it is not necessary for all merchants in a cluster to all co-occur in many consumers' transactions. Instead, co-occurrence is associative: if merchants A and B co-occur frequently, and merchants B and C co-occur frequently, A and C are likely to be in the same merchant segment.

A second clustering approach is to use the consumer vectors. For each account identifier, a consumer vector is generated as the summation of the vectors of the merchants at which the consumer has purchased in a defined time interval, such as the previous three months. A simple embodiment of this is:

$$C = \sum_{i=1}^{N} V_i \quad [26]$$

where C is the consumer vector for an account, N is the number of unique root merchant names in the customer account's transaction data within a selected time period, and $V_i$ is the merchant vector for the $i^{th}$ unique root merchant name. The consumer vector is then normalized to unit length.

A more interesting consumer vector takes into account various weighting factors to weight the significance of each merchant's vector:

$$C = \sum_{i=1}^{N} W_i V_i \quad [27]$$

where $W_i$ is a weight applied to the merchant vector $V_i$. For example, a merchant vector may be weighted by the total (or average) purchase amount by the consumer at the merchant in the time period, by the time since the last purchase, by the total number of purchases in the time period, or by other factors.

However computed, the consumer vectors can then be clustered, so that similar consumers, based on their purchasing behavior, form a merchant segment. This defines a merchant segment vector. The merchant vectors which are closest to a particular merchant segment vector are deemed to be included in the merchant segment.

With the merchant segments and their segment vectors, the predictive models for each segment may be developed. Before discussing the creation of the predictive models, a description of the training data used in this process is described.

F. Data Postprocessing Module

Following identification of merchant segments, a predictive model of consumer spending in each segment is generated from past transactions of consumers in the merchant segment. Using the past transactions of consumer in the merchant segment provides a robust base on which to predict future spending, and since the merchant segments were identified on the basis of the actual spending patterns of the consumers, the arbitrariness of conventional demographic based predictions are minimized. Additional non-segment specific transactions of the consumer may also be used to provide a base of transaction behavior.

To create the segment models, the consumer transaction data is organized into groups of observations. Each observation is associated with a selected end-date. The end-date divides the observation into a prediction window and an input window. The input window includes a set of transactions in a defined past time interval prior to the selected end-date (e.g. 6 months prior). The prediction window includes a set of transactions in a defined time interval after the selected end-date (e.g. the next 3 months). The prediction window transactions are the source of the dependent variables for the prediction, and the input window transactions are the source of the independent variables for the prediction.

Figure 8:
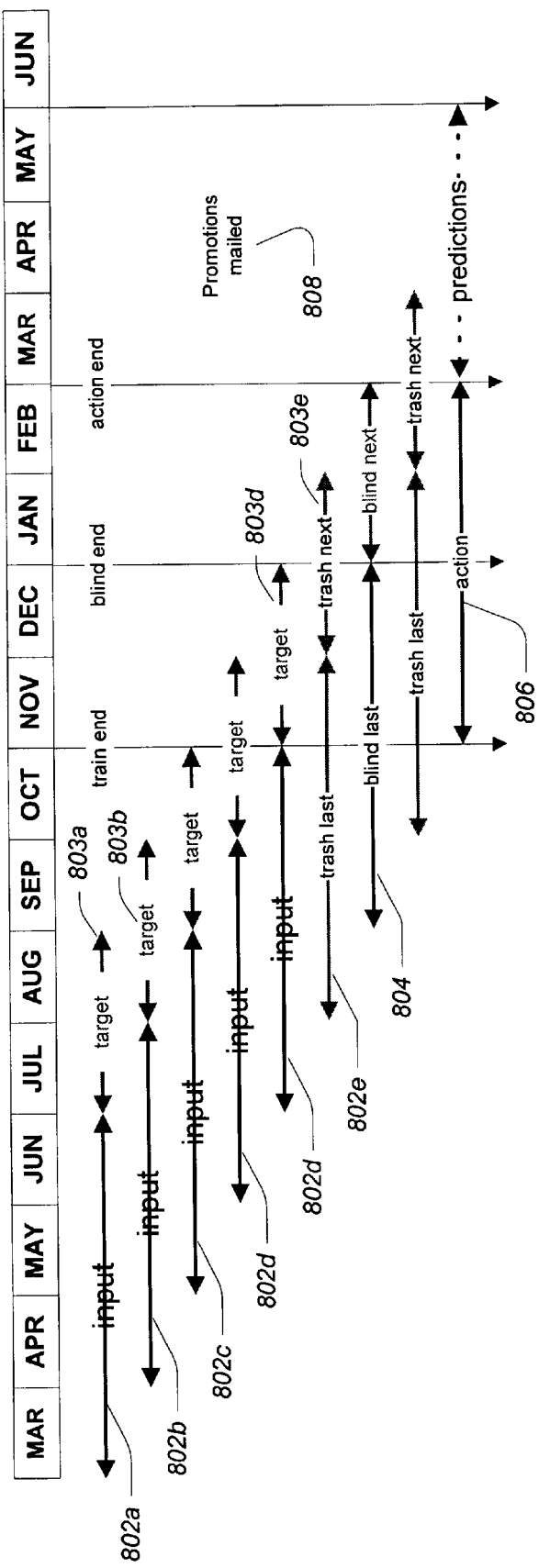
FIG. 8 is an illustration of the various types of observations during model training.

More particularly, the input for the observation generation module 530 are the master files 408. The output is a set of observations for each account. Each account receives three types of observations. FIG. 8 illustrates the observation types.

The first type of observations are training observations which are used to train the predictive models that predicts future spending within particular merchant segments. If N is the length (in months) of the window over which observation inputs are computed then there are 2N−1 training observations for each segment.

In FIG. 8, there are shown a 16 months of transaction data, from March of one year, to June of the next. Training observations are selected prior to the date of interest, November 1. The input window includes the 4 months of past data to predict the next 2 months in the prediction window. The first input window 802a thus uses a selected date of July 1, includes March–June to encompass the past transactions; transactions in July–August form the prediction window 803a. The next input window 802b, uses August 1 as the selected date, with transactions in April–July as the past transactions, August–September as prediction window 803b. The last input window for this set is 802d, which uses November 1 as its selected date, with an prediction window 803d of observations in November–December.

The second type of observations are blind observations. Blind observations are observations where the prediction window does not overlap any of the time frames for the prediction windows in the training observations. Blind observations are used to evaluate segment model performance. In FIG. 8, the blind observations 804 include those from September to February, as illustrated.

The third observation type is action observations, which are used in a production phase. Action observations have only inputs (past transactions given a selected date) and no target transactions after the selected date. These are preferably constructed with an input window that spans the final months of available data. These transactions are the ones on which the actual predictions are to be made. Thus, they should be the transactions in an input window that extends from a recent selected date (e.g most recent end of month), back the length of the input window used during training. In FIG. 8, the action observations 806 span November 1 to end of February, with the period of actual prediction being from March to end of May.

FIG. 8 also illustrates that at some point during the prediction window, the financial institution sends out promotions to selected consumers based on their predicted spending in the various merchant segments.

Referring to FIG. 4b again, the DPPM takes the master files 408, and a given selected end-date, and constructs for each consumer, and then for each segment, a set of training observations and blind observations from the consumer's transactions, including transactions in the segment, and any other transactions. Thus, if there are 300 segments, for each consumer there will be 300 sets of observations. If the DPPM is being used during production for prediction purposes, then the set of observations is a set of action observations.

For training purposes, the DPPM computes transactions statistics from the consumer's transactions. The transaction statistics serve as independent variables in the input window, and as dependent variables from transactions in the prediction window. In a preferred embodiment, these variables are as follows:

Prediction window: The dependent variables are generally any measure of amount or rate of spending by the consumer in the segment in the prediction window. A simple measure is the total dollar amount that was spent in the segment by the consumer in the transactions in the prediction window. Another measure may be average amount spent at merchants (e.g. total amount divided by number of transactions).

Input window: The independent variables are various measures of spending in the input window leading up to the end date (though some may be outside of it). Generally, the transaction statistics for a consumer can be extracted from various grouping of merchants. These groups may be defined as: 1) merchants in all segments; 2) merchants in the merchant segment being modeled; 3) merchants whose merchant vector is closest the segment vector for the segment being modeled (these merchants may or may not be in the segment); and 4) merchants whose merchant vector is closest to the consumer vector of the consumer.

One preferred set of input variables includes:

(1) Recency. The amount of time in months between the current end date and the most recent transaction of the consumer in any segment. Recency may computed over all available time and is not restricted to the input window.

(2) Frequency. The number of transactions by a consumer in the input window preceding the end-date for all segments.

(3) Monetary value of purchases. A measure of the amount of dollars spent by a customer in the input window preceding the end-date for all segments. The total or average, or other measures may be used.

(4) Recency_segment. The amount of time in months between the current end date and the most recent transaction of the consumer in the segment. Recency may be computed over all available time and is not restricted to the input window.

(5) Frequency_segment. The number of transactions in the segment by a customer in the input window preceding the current end date.

(6) Monetary_segment. The amount of dollars spent in the segment by a customer in the input window preceding the current end date.

(7) Recency nearest profile merchants. The amount of time in months between the current end date and the most recent transaction of the consumer in a collection of merchants that are nearest the consumer vector of the consumer. Recency may be computed over all available time and is not restricted to the input window.

(8) Frequency nearest profile merchants. The number of transactions in a collection of merchants that are nearest the consumer vector of the consumer by the consumer in the input window preceding the current end date.

(9) Monetary nearest frequency merchants. The amount of dollars spent in a collection of merchants that are nearest the consumer vector of the consumer by the consumer in the input window preceding the current end date.

(10) Recency nearest segment merchants. The amount of time in months between the current end date and the most recent transaction of the consumer in a collection of merchants that are nearest the segment vector. Recency may be computed over all available time and is not restricted to the input window.

(11) Frequency nearest segment merchants. The number of transactions in a collection of merchants that are nearest the segment vector by the consumer in the input window preceding the current end date.

(12) Monetary nearest segment merchants. The amount of dollars spent in a collection of merchants that are nearest the segment vector by the consumer in the input window preceding the current end date.

(13) Segment probability score. The probability that a consumer will spend in the segment in the prediction window given all merchant transactions for the consumer in the input window preceding the end date. A preferred algorithm estimates combined probability using a recursive Bayesian method.

(14) Seasonality variables. It is assumed that the fundamental period of the cyclic component is known. In the case of seasonality, it can be assumed that the cycle of twelve months. Two variables are added to the model related to seasonality. The first variable codes the sine of the date and the second variable codes the cosine of the date. The calculation for these variables are:

$$\text{Sin Input} = \sin(2.0 * PI * (\text{sample day of year})/365)$$

Cos Input=cos(2.0*PI*(sample month of year)/365).

(15) (Segment Vector-Consumer Vector Closeness: As an optional input, the dot product of the segment vector for the segment and the consumer vector is used as an input variable.

In addition to these transaction statistics, variables may be defined for the frequency of purchase and monetary value for all cases of segment merchants, nearest profile merchants, nearest segment merchants for the same forward prediction window in the previous year(s).

G. Predictive Model Generation

Figure 9:
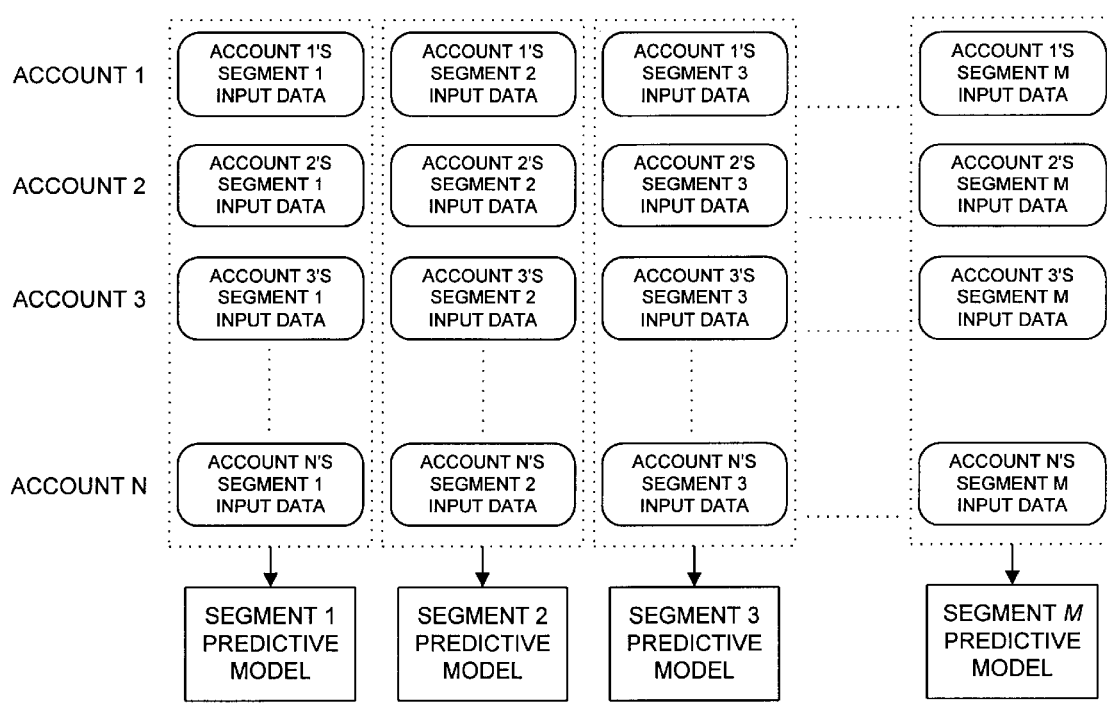
FIG. 9 is an illustration of the application of multiple consumer account data to the multiple segment predictive models.

The training observations for each segment are input into the segment predictive model generation module 530 to generate a predictive model for the segment. FIG. 9 illustrates the overall logic of the predictive model generation process. The master files 408 are organized by accounts, based on account identifiers, here illustratively, accounts 1 through N. There are M segments, indicated by segments 1 through M. The DPPM generates for each combination of account and merchant segment, a set of input and blind observations. The respective observations for each merchant segment M from the many accounts 1 . . . N are input into the respective segment predictive model M during training. Once trained, each segment predictive model is tested with the corresponding blind observations. Testing may be done by comparing for each segment a lift chart generated by the training observations with the lift chart generated from blind observations. Lift charts are further explained below.

The predictive model generation module 530 is preferably a neural network, using a conventional multi-layer organization, and backpropagation training. In a preferred embodiment, the predictive model generation model 530 is provided by HNC Software's Database Mining Workstation, available from HNC Software of San Diego, Calif.

While the preferred embodiment uses neural networks for the predictive models, other types of predictive models may be used. For example, linear regression models may be used.

H. Profiling Engine

The profiling engine 412 provides analytical data in the form of an account profile about each customer whose data is processed by the system 400. The profiling engine is also responsible for updating consumer profiles over time as new transaction data for consumers is received. The account profiles are objects that can be stored in a database 414 and are used as input to the computational components of system 400 in order to predict future spending by the customer in the merchant segments. The profile database 414 is preferably ODBC compliant, thereby allowing the accounts provider (e.g. financial institution) to import the data to perform SQL queries on the customer profiles.

The account profile preferably includes a consumer vector, a membership vector describing a membership value for the consumer for each merchant segment, such as the consumer's predicted spending in each segment in a predetermined future time interval, and the recency, frequency, and monetary variables as previously described for predictive model training.

The profiling engine 412 creates the account profiles as follows.

1. Membership Function: Predicted Spending in Each Segment

The profile of each account holder includes a membership value with respect to each segment. The membership value is computed by a membership function. The purpose of the membership function is to identify the segments with which the consumer is mostly closely associated, that is, which best represent the group or groups of merchants at which the consumer has shopped, and is likely to shop at in the future.

In a preferred embodiment, the membership function computes the membership value for each segment as the predicted dollar amount that the account holder will purchase in the segment given previous purchase history. The dollar amount is projected for a predicted time interval (e.g. 3 months forward) based on a predetermined past time interval (e.g. 6 months of historical transactions). These two time intervals correspond to the time intervals of the input window and prediction windows used during training of the merchant segment predictive models. Thus, if there are 300 merchant segments, then a membership value set is a list of 300 predicted dollar amounts, corresponding to the respective merchant segments. Sorting the list by the membership value identifies the merchant segments at which the consumer is predicted to spend the greatest amounts of money in the future time interval, given their spending historically.

To obtain the predicted spending, certain data about each account is input in each of the segment predictive models. The input variables are constructed for the profile consistent with the membership function of the profile. Preferably, the input variables are the same as those used during model training, as set forth above. An additional input variable for the membership function may include the dot product between the consumer vector and the segment vector for the segment (if the models are so trained). The output of the segment models is a predicted dollar amount that the consumer will spend in each segment in the prediction time interval.

2. Segment Membership Based on Consumer Vectors

A second alternate, membership aspect of the account profiles is membership based upon the consumer vector for each account profile. The consumer vector is a summary vector of the merchants that the account has shopped at, as explained above with respect to the discussion of clustering. In this aspect, the dot product of the consumer vector and segment vector for the segment defines a membership value. In this embodiment, the membership value list is a set of 300 dot products, and the consumer is member of the merchant segment(s) having the highest dot product(s).

With either one of these membership functions, the population of accounts that are members of each segment (based on the accounts having the highest membership values for each segment) can be determined. From this population, various summary statistics about the accounts can be generated such as cash advances, purchases, debits, and the like. This information is further described below.

3. Updating of Consumer Profiles

As additional transactions of a consumer are received periodically (e.g. each month) the merchant vectors associated with the merchants in the new transactions can be used to update the consumer vector, preferably using averaging techniques, such as exponential averaging over the desired time interval for the update.

Updates to the consumer vector are preferably a function of dollars spent perhaps relative to the mean of the dollars spent at the merchant. Thus, merchant vectors are weighted in the new transaction period by both the time and the significance of transactions for the merchant by the consumer (e.g. weighted by dollar amount of transactions by consumer at merchant). One formula for weighting merchants is:

$$W_i = S_i e^{\lambda t} \quad [28]$$

where $W_i$ is the weight to be applied to merchant i's merchant vector;

$S_i$ is the dollar amount of transactions at merchant i in the update time interval;

t is the amount of time since the last transaction at merchant i; and $\lambda$ is a constant that controls the overall influence of the merchant.

The profiling engine 412 also stores a flag for each consumer vector indicating the time of the last update.

I. Reporting Engine

The reporting engine 426 provides various types of segment and account specific reports. The reports are generated by querying the profiling engine 412 and the account database for the segments and associated accounts, and tabulating various statistics on the segments and accounts.

1. Basic Reporting Functionality

The reporting engine 426 provides functionality to:

a) Search by merchant names, including raw merchant names, root names, or equivalence names.

b) Sort merchant lists by merchant name, frequency of transactions, transaction amounts and volumes, number of transactions at merchant, or SIC code.

c) Filter contents of report by number of transactions at merchant.

The reporting engine 426 provides the following types of reports, responsive to these input criteria:

2. General Segment Report

For each merchant segment a very detailed and powerful analysis of the segment can be created in a segment report. This information includes:

a) General Segment Information

Merchant Cohesion: A measure of how closely clustered are the merchant vectors in this segment. This is the average of the dot products of the merchant vectors with the centroid vector of this segment. Higher numbers indicate tighter clustering.

Number of Transactions: The number of purchase transactions at merchants in this segment, relative to the total number of purchase transactions in all segments, providing a measure of how significant the segment is in transaction volume.

Dollars Spent: The total dollar amount spent at merchants in this segment, relative to the total dollar amount spent in all segments, providing a measure of dollar volume for the segment.

Most Closely Related Segments: A list of other segments that are closest to the current segment. This list may be ranked by the dot products of the segment vectors, or by a measure of the conditional probability of purchase in the other segment given a purchase in the current segment.

The conditional probability measure M is as follows: P(A|B) is probability of purchase in segment A segment in next time interval (e.g. 3 months) given purchases in segment B in the previous time interval (e.g. 6 months). P(A|B)/P(A)=M. If M is >1, then a purchase in segment B is positively influencing the probability of purchase in segment A, and if M<1 then a purchase in segment B negatively influences a purchase in segment A. This is because if there is no information about the probability of purchases in segment B, then P(A|B)=P(A), so M=1. The values for P(A|B) are determined from the co-occurrences of purchases at merchants in the two segments, and P(A) is determined and from the relative frequency of purchases in segment A compared to all segments.

A farthest segments list may also be provided (e.g. with the lowest conditional probability measures).

b) Segment Members Information

Detailed information is provided about each merchant which is a member of a segment. This information comprises:

Merchant Name and SIC code;

Dollar Bandwidth: The fraction of all the money spent in this segment that is spent at this merchant (percent);

Number of transactions: The number of purchase transactions at this merchant;

Average Transaction Amount: The average value of a purchase transaction at this merchant;

Merchant Score: The dot product of this merchant's vector with the centroid vector of the merchant segment. (A value of 1.0 indicates that the merchant vector is at the centroid);

SIC Description: The SIC code and its description;

This information may be sorted along any of the above dimensions.

c) Lift Chart

A lift chart useful for validating the performance of the predictive models by comparing predicted spending in a predicted time window with actual spending.

Table 10 illustrates a sample lift chart for merchant segment:

TABLE 10

A sample segment lift chart

| Bin | Cumulative segment lift | Cumulative segment lift in S | Cumulative Population |
|---|---|---|---|
| 1 | 5.56 | $109.05 | 50,000 |
| 2 | 4.82 | $94.42 | 100,000 |
| 3 | 3.82 | $74.92 | 150,000 |
| 4 | 3.23 | $63.38 | 200,000 |
| 5 | 2.77 | $54.22 | 250,000 |
| 6 | 2.43 | $47.68 | 300,000 |
| 7 | 2.20 | $43.20 | 350,000 |
| 8 | 2.04 | $39.98 | 400,000 |
| 9 | 1.88 | $36.79 | 450,000 |
| 10 | 1.75 | $34.35 | 500,000 |
| 11 | 1.63 | $31.94 | 550,000 |
| 12 | 1.52 | $29.75 | 600,000 |
| 13 | 1.43 | $28.02 | 650,000 |
| 14 | 1.35 | $26.54 | 700,000 |
| 15 | 1.28 | $25.08 | 750,000 |
| 16 | 1.21 | $23.81 | 800,000 |
| 17 | 1.16 | $22.65 | 850,000 |
| 18 | 1.10 | $21.56 | 900,000 |
| 19 | 1.05 | $20.57 | 950,000 |
| 20 | 1.00 | $19.60 | 1,000,000 |
| Base-line | — | $19.60 | |

Lift charts are created generally as follows:

As before, there is defined input window and prediction window, for example 6 and 3 months respectively. Data from the total length of these windows relative to end of the most recent spending data available is taken. For example, if data on actual spending in the accounts is available through the end of the current month, then the prior three months of actual data will be used as the prediction window, and the data for the six months prior to that will be data for input window. The input data is then used to "predict" spending in the three month prediction window, for which in fact there is actual spending data. The predicted spending amounts are now compared with the actual amounts to validate the predictive models.

For each merchant segment then, the consumer accounts are ranked by their predicted spending for the segment in the prediction window period. Once the accounts are ranked, they are divided into N (e.g. 20) equal sized bins so that bin 1 has the highest spending accounts, and bin N has the lowest ranking accounts. This identifies the accounts holders that the predictive model for the segment indicated should be are expected to spend the most in this segment.

Then, for each bin, the average actual spending per account in this segment in the past time period, and the average predicted spending is computed. The average actual spending over all bins is also computed. This average actual spending for all accounts is the baseline spending value (in dollars), as illustrated in the last line of Table 10. This number describes the average that all account holders spent in the segment in the prediction window period.

The lift for a bin is the average actual spending by accounts in the bin divided by the baseline spending value. If the predictive model for the segment is accurate, then those accounts in the highest ranked bins should have a lift greater than 1, and the lift should generally be increasing, with bin 1 having the highest lift. Where this the case, as for example, in Table 10, in bin 1, this shows that those accounts in bin 1 in fact spent several times the baseline, thereby confirming the prediction that these accounts would in fact spend more than others in this segment.

The cumulative lift for a bin is computed by taking the average spending by accounts in that bin and all higher ranking bins, and dividing it by the baseline spending (i.e. the cumulative lift for bin 3 is the average spending per account in bins 1 through 3, divided by the baseline spending.) The cumulative lift for bin N is always 1.0. The cumulative lift is useful to identify a group of accounts which are to be targeted for promotional offers.

The lift information allows the financial institution to very selectively target a specific group of accounts (e.g. the accounts in bin 1) with promotional offers related to the merchants in the segment. This level of detailed, predictive analysis of very discrete groups of specific accounts relative to merchant segments is not believed to be currently available by conventional methods.

d) Population Statistics Tables

The reporting engine 426 further provides two types of analyses of the financial behavior of a population of accounts that are associated with a segment based on various selection criteria. The Segment Predominant Scores Account Statistics table and the Segment Top 5% Scores Account Statistics table present averaged account statistics for two different types of populations of customers who shop, or are likely to shop, in a given segment. The two populations are determined as follows.

Segment Predominant Scores Account Statistics Table: All open accounts with at least one purchase transaction are scored (predicted spending) for all of the segments. Within each segment, the accounts are ranked by score, and assigned a percentile ranking. The result is that for each account there is a percentile ranking value for each of the merchant segments.

The population of interest for a given segment is defined as those accounts which have their highest percentile ranking in this segment. For example, if an account has its highest percentile ranking in segment #108, that account will be included in the population for the statistics table for segment #108, but not in any other segment. This approach assigns each account holder to one and only one segment.

Segment Top 5% Scores Account Statistics. For the Segment Top 5% Scores Account Statistics table, the population is defined as the accounts with percentile ranking of 95% or greater in a current segment. These are the 5% of the population that is predicted to spend the most in the segment in the predicted future time interval following the input data time window. These accounts may appear in this population in more than one segment, so that high spenders will show up in many segments; concomitantly, those who spend very little may not assigned to any segment.

The number of accounts in the population for each table is also determined and can be provided as a raw number, and as a percentage of all open accounts (as shown in the titles of the following two tables).

Table 11 and Table 12 provide samples of these two types of tables:

TABLE 11

Segment Predominant Scores Account Statistics:
8291 accounts (0.17 percent)

| Category | Mean Value | Std Deviation | Population Mean | Relative Score |
|---|---|---|---|---|
| Cash Advances | $11.28 | $53.18 | $6.65 | 169.67 |
| Cash Advance Rate | 0.03 | 0.16 | 0.02 | 159.92 |
| Purchases | $166.86 | $318.86 | $192.91 | 86.50 |
| Purchase Rate | 0.74 | 1.29 | 1.81 | 40.62 |
| Debits | $178.14 | $324.57 | $199.55 | 89.27 |
| Debit Rate | 0.77 | 1.31 | 1.84 | 41.99 |
| Dollars in Segment | 4.63 | 14.34 | 10.63% | 43.53 |
| Rate in Segment | 3.32 | 9.64 | 11.89% | 27.95 |

TABLE 12

Segment Top 5% Scores Account Statistics:
154786 accounts (3.10 percent)

| Category | Mean Value | Std Deviation | Population Mean | Relative Score |
|---|---|---|---|---|
| Cash Advances | $9.73 | $51.21 | $7.27 | 133.79 |
| Cash Advance Rate | 0.02 | 0.13 | 0.02 | 125.62 |
| Purchases | $391.54 | $693.00 | $642.06 | 60.98 |
| Purchase Rate | 2.76 | 4.11 | 7.51 | 36.77 |
| Debits | $401.27 | $702.25 | $649.34 | 61.80 |
| Debit Risk | 2.79 | 4.12 | 7.53 | 37.00 |
| Dollars in Segment | 1.24 | 8.14 | 1.55% | 80.03 |
| Rate in Segment | 0.99 | 6.70 | 1.79% | 55.04 | i) Segment Statistics

The tables present the following statistics for each of several categories, one category per row. The statistics are:
Mean Value: the average over the population being scored;
Std Deviation: the standard deviation over the population being scored;
Population Mean: the average, over all the segments, of the Mean Value (this column is thus the same for all segments, and are included for ease of comparison); and
Relative Score: the Mean Value, as a fraction of the Population Mean (in percent).

ii) Row Descriptions

Each table contains rows for spending and rate in Cash Advances, Purchases, Debits, and Total Spending.

The rows for spending (Cash Advances, Purchases, and Debits) show statistics on dollars per month for all accounts in the population over the time period of available data.

The rate rows (Cash Advance Rate, Debit Rate, and Purchase Rate) show statistics on the number of transactions per month for all accounts in the population over the time period of available data.

Debits consist of Cash Advances and Purchases.

The Dollars in Segment shows the fraction of total spending that is spent in this segment. This informs the financial institution of how significant overall this segment is.

The Rate in Segment shows the fraction of total purchase transactions that occur in this segment.

The differences between these two populations are subtle but important, and are illustrated by the above tables. The segment predominant population identifies those individuals as members of a segment who, relative to their own spending, are predicted to spend the most in the segment. For example, assume a consumer whose predicted spending in a segment is $20.00, which gives the consumer a percentile ranking of $75^{th}$ percentile. If the consumer's percentile ranking in every other segment is below the $75^{th}$ percentile, then the consumer is selected in this population for this segment. Thus, this may be considered an intra-account membership function.

The Top 5% scores population instead includes those accounts holders predicted to spend the most in the segment, relative to all other account holders. Thus, the account holder who was predicted to spend only $20.00 in the merchant segment will not be member of this population since he is well below the $95^{th}$ percentile, which may be predicted to spend, for example $100.00.

In the example tables these differences are pronounced. In Table 11, the average purchases of the segment predominant population is only $166.86. In Table 12, the average purchase by top 5% population is more than twice that, at $391.54. This information allows the financial institution to accurately identify accounts which are most likely to spend in a given segment, and target these accounts with promotional offers for merchants in the segment.

The above tables may also be constructed based on other functions to identify accounts associated with segments, including dot products between consumer vectors and segment vectors.

J. Targeting Engine

The targeting engine 422 allows the financial institution to specify targeted populations for each (or any) merchant segment, to enable selection of the targeted population for receiving predetermined promotional offers.

A financial institution can specify a targeted population for a segment by specifying a population count for the segment, for example, the top 1000 accounts holders, or the top 10% account holders in a segment. The selection is made by any of the membership functions, including dot product, or predicted spending. Other targeting specifications may be used in conjunction with these criteria, such as a minimum spending amount in the segment, such as $100. The parameters for selecting the targeting population are defined in a target specification document 424 which is an input to the targeting engine 422. One or more promotions can be specifically associated with certain merchants in a segment, such as the merchants with the highest correlation with the segment vector, highest average transaction amount, or other selective criteria. In addition, the amounts offered in the promotions can be specific to each consumer selected, and based on their predicted or historical spending in the segment. The amounts may also be dependent on the specific merchant for whom a promotion is offered, as a function of the merchant's contributions to purchases in the segment, such as based upon their dollar bandwidth, average transaction amount, or the like.

The selected accounts can be used to generate a targeted segmentation report 430 by providing the account identifiers for the selected accounts to the reporting engine 426, which constructs the appropriate targeting report on the segment. This report has the same format as the general segment report but is compiled for the selected population.

An example targeting specification 424 is shown below:

TABLE 13

Target population specification

| ID associated with promotional offer | Segment ID | Customer target count | Selection Criteria | Filter Criteria |
|---|---|---|---|---|
| 1 | 122 | 75,000 | Predicted Spending in Segment | Average Transaction in Segment >$50 |
| 1 | 143 | Top 10% | Dot Product | Total Spending in Segment >$100 |
| 2 | 12 and 55 | 87,000 | Predicted Spending in this Segment 12 and 55 | None |

Table 13 shows a specification of a total of at least 228,000 customer accounts distributed over four segments and two promotional offers (ID 1 and ID 2). For each segment or promotional offer, there are different selection and filtering criteria. For promotion #1 the top 75,000 consumers in segment #122 based on predicted spending, and who have an average transaction in the segment greater than $50, are selected. For this promotion in segment #413, the top 10% of accounts based on the dot product between the consumer vector and segment vector are selected, so long as they have a minimum spending in the segment of $100. Finally, for promotion #2, 87,000 consumers are selected across two segments. Within each offer (e.g. offer ID 1) the segment models may be merged to produce a single lift chart which reflects the offer as a composition of the segments. The targeting engine 422 then provides the following additional functionality:

1. Select fields from the account profile of the selected accounts that will inserted to the mail file 434. For example, the name, address, and other information about the account may be extracted.
2. The mail file 434 is then exported to a useful word processing or bulk mailing system.
3. Instruct the reporting engine 426 to generate reports that have summary and cumulative frequencies for select account fields, such as including purchase, debit, cash advance, or any other account data.
4. Instruct the reporting engine 426 to generate lift charts for the targeting population in the segment, and for overlapped (combined) segments.

K. Segment Transition Detection

As is now apparent, the system of the present invention provides detailed insight into which merchant segments a consumer is associated with based on various measures of membership, such as dot product, predicted spending, and the like. Further, since the consumers continue to spend over time, the consumer accounts and the consumers' associations with segments is expected to change over time as their individual spending habits change.

The present invention allows for detection of the changes in consumer spending via the segment transition detection engine 420. In a given data period (e.g. next monthly cycle or multiple month collection of data) a set of membership values for each consumer is defined as variously described above, with respect to each segment. Again, this may be predicted spending by the consumer in each segment, dot product between the consumer vector and each segment vectors, or other membership functions.

In a subsequent time interval, using additional spending and/or predicted data, the membership values are recomputed. Each consumer will have the top P and the bottom Q increases in and decreases in segment membership. That is, there will be two changes of interest: the P (e.g. 5) segments with the greatest increase in membership values for the consumer; the Q segments with the greatest decrease in segment membership.

An increase in the membership value for a segment indicates that the consumer is now (or predicted to) spend more money in a particular segment. Decreases show a decline in the consumer's interest in the segment. Either of these movements may reflect a change in the consumer's lifestyle, income, or other demographic factors.

Significant increases in merchant segments which previously had low membership values are particularly useful to target promotional offers to the account holders who are moving into the segment. This is because the significant increase in membership indicates that the consumer is most likely to be currently receptive to the promotional offers for merchants in the segment, since they are predicted to be purchasing more heavily in the segment.

Thus, the segment transition detection engine 420 calculates the changes in each consumer's membership values between two selected time periods, typically using data in a most recent prediction window (either ending or beginning with a current statement date) relative to memberships in prior time intervals. The financial institution can define a threshold change value for selecting accounts with changes in membership more significant than the threshold. The selected accounts may then be provided to the reporting engine 426 for generation of various reports, including a segment transition report 432 which is like the general segment report except that it applies to accounts that are considered to have transitioned to or from a segment. This further enables the financial institution to selectively target these customers with promotional offers for merchants in the segments in which the consumer had the most significant positive increases in membership.

In summary then, the present invention provides a variety of powerful analytical methods which predict consumer financial behavior in discretely defined merchant segments, and with respect to predetermined time intervals. The clustering of merchants in merchant segments allows analysis of transactions of consumers in each specific segment, both historically, and in the predicted period to identify consumers of interest. Identified consumers can then be targeted with promotional offers precisely directed at merchants within specific segments.

APPENDIX I: N-gram Matching Algorithm

1. A set of training examples is presented to the algorithm. In this case, the training examples are all the merchant names that are being processed.
2. Each training example is broken down into all possible n-grams, for a selected value of n (n=3 for trigrams) E.g. the merchant name "wal-mart" yields the trigrams ^^w, ^wa, wal, al-, l-m, -ma, mar, art, rt^, t^^, where ^ is an "end of string" token.
3. The frequencies with which each trigram appears anywhere in the training examples are counted.
4. In the preferred embodiment, each trigram is assigned a weight, given by $$W_{xyz} = \log\left(\frac{N}{F_{xyz}}\right)$$

where xyz indicates the particular trigram, $F_{xyz}$ is the number of times the trigram appeared anywhere in the training examples, and N is the maximum value of F for all trigrams. Thus, frequently occurring trigrams are assigned low weights, while rare trigrams are assigned high weights. Other weighting schemes, including uniform weights, are possible.

5. A high dimensional vector space is constructed, with one dimension for each trigram that appears in the set of training examples.
6. To compare two particular strings of characters (merchant names), string1 and string2, each string is represented by a vector in the vector space. The vector for a string1 is constructed by:
    a) counting the frequency of each trigram in the string, $F_{xyz}$
    b) assembling a weighted sum of unit vectors, $$\vec{V}_{string1} = \sum_{xyz} W_{xyz} f_{xyz} \vec{u}_{xyz}$$

where xyz ranges over all trigrams in string1, and $\vec{u}_{xyz}$ is a unit vector in the direction of the xyz dimension in the vector space.
    c) normalizing $V_{string1}$ to length a length of one (preferred embodiment), or utilizing another normalization, or providing no normalization at all.
    d) construct the similar vector corresponding to the other string, $V_{string2}$
    e) take the dot product of $V_{string1}$ and $V_{string2}$. A high dot product (near one) indicates that the two strings are closely related, while a low dot product (near zero) indicates that the two strings are not related.
7. Two merchant names are equivalenced if their vectors' dot product is greater than a particular threshold. This threshold is typically in the range of 0.6 to 0.9 for the preferred embodiment.

APPENDIX II: Geometrically Derived Vector Training Algorithm

Initialize:
For each stem, i ∈ {all stems in corpus}
$\vec{V}_i$=rand_vector // random vector for stem i
Normalize $\vec{V}_i$ to length 1
$\Delta \vec{V}_i = \vec{0}$, //zero initialized update vector for stem i
END
For each stem, i ∈ {all stems in corpus}
Calculate Updates:
For each stem, j ∈ {all stems that co-occurred with stem i}, j≠i
  We wish to calculate a new vector, $U_{ij}$, that is the ideal position of $V_i$ with respect to $V_j$. In other words, we want the dot product of $U_{ij}$ with $V_j$ to be $d_{ij}$, we want $U_{ij}$ to have unit length, and we want $U_{ij}$ to lie in the plane defined by $V_i$ and $V_j$.
  $\vec{D} = \vec{V}_i - \vec{V}_j$ //vector difference between vectors for stems j and i.

$\vec{\theta} = \vec{D} - \vec{V}_j \cdot \text{dot}(\vec{V}_j, \vec{D})$ //θ is vector of components of D which are orthogonal to Vj. This defines a plane between Vj and θ in which Vi lies.

$$\hat{\theta} = \frac{\vec{\theta}}{\|\vec{\theta}\|}$$

//normalize θ

$$l = \text{sqrt}\left(\frac{1 - d_{ij}^2}{d_{ij}^2}\right)$$

//l is weight for θ
IF $d_{ij}$>0 THEN //if positive relationship between stems j and i $\vec{U}_{ij} = \vec{V}_j + l \cdot \vec{\theta}$ ELSE IF $d_{ij}$<0 THEN //if negative relationship $\vec{U}_{ij} = -\vec{V}_j + l \cdot \vec{\theta}$

END IF $$\vec{U}_{ij} = \frac{\vec{U}_{ij}}{\|\vec{U}_{ij}\|}$$

//normalize
We construct a weighted sum of the $U_{ij}$ for all j to derive an estimate of where $V_i$ should be.
IF weight_mode == LOG_FREQ THEN $\Delta\vec{V}_i = \Delta\vec{V}_i + \vec{U}_{ij} \cdot [1 - \text{dot}(\vec{U}_{ij}, \vec{V}_i)] \cdot [1 + \log F[j]]$ ELSE IF weight_mode == FREQ THEN $\Delta\vec{V}_i = \Delta\vec{V}_i + \vec{U}_{ij} \cdot [1 - \text{dot}(\vec{U}_{ij}, \vec{V}_i)] \cdot F[j]$

ELSE $\Delta\vec{V}_i = \Delta\vec{V}_i + \vec{U}_{ij} \cdot [1 - \text{dot}(\vec{U}_{ij}, \vec{V}_i)]$ END IF
END j
Perform Update:

$\vec{V}_i^{new} = (1-\text{gamma}) \cdot \vec{V}_i + \text{gamma} \cdot \Delta\vec{V}_i$ $$\vec{V}_i^{new} = \frac{\vec{V}_i^{new}}{\|\vec{V}_i^{new}\|}$$

END i
NOTES:
1) Stems here are root merchant names.
2) The list of stems j (merchant names) which co-occur with stem i is known from the co-occurrence data.
3) dij is relationship strength measure, calculated by UDL1, UDL2, or UDL3.
4) F[j] is the frequency at which stem j appears in the data.
5) Weight_mode is a user controlled value that determines the influence that F[j] has on the U. If weight_mode is FREQ then the frequency of stem j directly effects U, so that higher frequency stems (merchant names) strongly influence the resulting merchant vector of merchant i. A slower influence is provided by weight_mode=LOG FREQ, which uses the log of F[j]. If weight_mode is not set, then the default is no influence by F[j].
6) Gamma is a learning rate 0–1, typically 0.5 to 0.9

APPENDIX III: Algebraically Derived Vector Training Algorithm

Initialize:

For each stem, i ∈ {all stems in corpus}.

$\vec{V}_i$=rand_vector // initialize a random vector for stem i

Normalize $\vec{V}_i$ //normalize vector to unit length $\Delta\vec{V}_i$=0, //define a zero initialized update vector for stem i END
For each stem, i ∈ {all stems in corpus}
Calculate Updates:
For each stem, j ∈ {all stems that co-occurred with stem i}, j≠i
  // this is all merchants j which co-occur with merchant i
  We wish to calculate a new vector, $U_{ij}$, that is the ideal position of $V_i$ with respect to $V_j$. In other words, we want the dot product of $U_{ij}$ with $V_j$ to be $d_{ij}$, we want $U_{ij}$ to have unit length, and we want $U_{ij}$ to lie in the plane defined by $V_i$ and $V_j$.

$\vec{U}_{ij}$ can be expressed as a linear combination of $\vec{V}_i$ and $\vec{V}_j$ where:

$\epsilon_{ij} = \text{dot}(V_i, V_j)$, $$\rho_{ij} = \left(\frac{1 - d_{ij}^2}{1 - \epsilon_{ij}^2}\right)^{\frac{1}{2}},$$

and $\vec{U}_{ij} = (d_{ij} - \epsilon_{ij}\rho_{ij})V_j + \rho_{ij}V_i$.

We construct a weighted sum of the $U_{ij}$ for all j to derive an estimate of where $V_i$ should be.
IF weight_mode == LOG_FREQ THEN $\Delta\vec{V}_i = \Delta\vec{V}_i + \vec{U}_{ij} \cdot [1 - \text{dot}(\vec{U}_{ij}, \vec{V}_i)] \cdot [1 + \log F[j]]$ ELSE IF weight_mode == FREQ THEN $\Delta\vec{V}_i = \Delta\vec{V}_i + \vec{U}_{ij} \cdot [1 - \text{dot}(\vec{U}_{ij}, \vec{V}_i)] \cdot F[j]$

ELSE $\Delta\vec{V}_i = \Delta\vec{V}_i + \vec{U}_{ij} \cdot [1 - \text{dot}(\vec{U}_{ij}, \vec{V}_i)]$ END IF
END j
Perform Update:

$\vec{V}_i^{new} = (1-\text{gamma}) \cdot \vec{V}_i + \text{gamma} \cdot \Delta\vec{V}_i$ $$\vec{V}_i^{new} = \frac{\vec{V}_i^{new}}{\|\vec{V}_i^{new}\|}$$

END i

Notes:
1) Stems here are root merchant names.
2) The list of stems j (merchant names) which co-occur with stem i is known from the co-occurrence data.
3) dij is relationship strength measure, calculated by UDL1, UDL2, or UDL3.
4) F[j] is the frequency at which stem j appears in the data.
5) Weight_mode is a user controlled value that determines the influence that F[j] has on the U. If weight_mode is FREQ then the frequency of stem j directly effects U, so that higher frequency stems (merchant names) strongly influence the resulting merchant vector of merchant i. A slower influence is provided by weight_mode=LOG FREQ, which uses the log of F[j]. If weight_mode is not set, then the default is no influence by F[j].
6) Gamma is a learning rate 0–1,typically 0.5 to 0.9

We claim:

1. A method of predicting financial behavior of consumers, comprising:
   generating from transaction data for a plurality of consumers, a date ordered sequence of transactions for each consumer;
   selecting for each consumer a set of the date ordered transactions to form a group of input transactions for the consumer; and
   for each consumer, applying the input transactions of the consumer to each of a plurality of merchant segment predictive models, each merchant segment predictive model defining for a group of merchants a prediction function between input transactions in a past time interval and predicted spending in a subsequent time interval, to produce for each consumer a predicted spending amount in each merchant segment.

2. The method of claim 1, further comprising:
   for each consumer, associating the consumer with the merchant segment for which the consumer had the highest predicted spending relative to other merchant segments.

3. The method of claim 1, further comprising:
   for each merchant segment, determining a segment vector as a summary vector of merchant vectors of merchants associated with the segment; and
   for each consumer, associating the consumer with the merchant segment having the greatest dot product between the segment vector of the segment and a consumer vector of the consumer.

4. The method of claim 1, further comprising:
   for each merchant segment:
     ranking the consumers by their predicted spending in the merchant segment;
     determining for each consumer a percentile ranking in the merchant segment;
   for each consumer:
     determining the merchant segment in which the consumer's percentile ranking is the highest, to uniquely associate each consumer with one merchant segment; and
   for each merchant segment, determining summary transaction statistics for the consumers uniquely associated with the merchant segment.

5. The method of claim 1, further comprising:
   for each merchant segment:
     ranking the consumers by their predicted spending in the merchant segment;
     determining for each consumer a percentile ranking in the merchant segment;
     selecting as a population, the consumers having a percentile ranking in excess of predetermined percentile threshold; and
     determining summary transaction statistics for selected population of consumers.

6. The method of claim 1, further comprising:
   establishing for each merchant in the transaction data a merchant vector; and
   updating the merchant vector of each merchant relative to the merchant vectors of other merchants according to co-occurrences of each merchant in the transaction data.

7. The method of claim 6, further comprising:
   updating the merchant vector of each merchant based upon an unexpected amount deviation in a frequency of co-occurrence of the merchant with other merchants.

8. The method of claim 6, further comprising:
   determining a co-occurrence frequency for each merchant with each other merchant in the transaction data;
   determining for each pair of merchants, a relationship strength between the pair of merchants based on how much the determined co-occurrence frequency deviates from an expected co-occurrence frequency;
   for each pair of merchant vectors, mapping the relationship strength into a vector space as a desired dot product between respective merchant vectors the merchants in the pair; and
   updating each merchant vectors so that the actual dot products between each pair of merchant vectors approximates the desired dot product between the merchant vectors.

9. The method of claim 8, wherein determining for each pair of merchants, a relationship strength between the pair of merchants further comprises:
   determining the relationship strength by $$r_{ij} = \frac{T_{ij} - \hat{T}_{ij}}{\sigma_{ij}} \approx \frac{T_{ij} - \hat{T}_{ij}}{\sqrt{\hat{T}_{ij}}}$$

where
$r_{ij}$ is the relationship strength between $merchant_i$ and $merchant_j$ in a pair of merchants;
$T_{ij}$ is the actual co-occurrence frequency of $merchant_i$ and $merchant_j$ in the transaction data; and
$\hat{T}_{ij}$ is the expected co-occurrence frequency of $merchant_i$ and $merchant_j$ in the transaction data.

10. The method of claim 8, wherein determining for each pair of merchants, a relationship strength between the pair of merchants further comprises:
   determining the relationship strength by $$r_{ij} = \text{sign}(T_{ij} - \hat{T}_{ij}) \cdot \sqrt{2 \ln \lambda}$$

where
$r_{ij}$ is the relationship strength between $merchant_i$ and $merchant_j$ in a pair of merchants;
$\lambda$ is a log-likelihood ratio;

$T_{ij}$ is the actual co-occurrence frequency of merchant$_i$ and merchant$_j$ in the transaction data; and $\hat{T}_{ij}$ is the expected co-occurrence frequency of merchant$_i$ and merchant$_j$ in the transaction data.

11. The method of claim 8, wherein determining for each pair of merchants, a relationship strength between the pair of merchants further comprises:

determining the relationship strength by $$r_{ij} = sign(T_{ij} - \hat{T}_{ij}) \cdot \sqrt{2\ln\lambda / \sqrt{\hat{T}_{ij}}} = sign(T_{ij} - \hat{T}_{ij}) \cdot \sqrt{2\ln\lambda} \cdot \hat{T}_{ij}^{1/4}$$

where $r_{ij}$ is the relationship strength between merchant$_i$ and merchant$_j$ in a pair of merchants;

$\lambda$ is a log-likelihood ratio;

$T_{ij}$ is the actual co-occurrence frequency of merchant$_i$ and merchant$_j$ in the transaction data; and $\hat{T}_{ij}$ is the expected co-occurrence frequency of merchant$_i$ and merchant$_j$ in the transaction data.

12. The method of claim 8, wherein updating each merchant vectors so that the actual dot products between each pair of merchant vectors approximates the desired dot product between the merchant vectors comprises a gradient descent update that updates the merchant vectors according to whether the actual dot product between them is greater or lesser than the desired dot product.

13. The method of claim 8, wherein updating each merchant vectors so that the actual dot products between each pair of merchant vectors approximates the desired dot product between the merchant vectors comprises determining for each merchant vector an error weighted average of the desired positions of the merchant vector from current position of each other merchant vector and the desired dot product between the merchant vector and each other merchant vector.

14. The method of claim 1, further comprising:

determining for each merchant name in the transaction data a merchant vector;

clustering the merchant vectors to form a plurality of merchant segments, wherein each merchant vector is associated with one and only one merchant segment;

for each merchant segment, determining from the transactions of consumers at the associated merchants of the merchant, statistical measures of consumer transactions in the segment.

15. The method of claim 1, further comprising:

selecting a plurality of consumers associated with at least one merchant segment, the selected plurality selected according to their predicted spending in the merchant segment; and providing promotional offers to the selected plurality of consumers.

16. The method of claim 1, further comprising:

training each of the merchant segment predictive models to predict spending in a predicted time period based upon transaction statistics of the consumer's transactions in a past time period.

17. The method of claim 16, wherein the transaction statistics comprises variables describing the recency of the consumer's transactions in one or more merchant segments, the frequency of the consumer's transactions in one or more merchant segments, and the amount of the consumer's transactions in one or more merchant segments.

18. A system for predicting consumer financial behavior, comprising:

a plurality of merchant segments, each merchant segment having a set of merchants associated therewith;

a plurality of merchant segment predictive models, each model associated with one of the merchant segments for predicting spending by an individual consumer in the merchant segment in a predicted time period as a function of transaction statistics of the consumer for transactions in a prior time period; and a data processing module that receives transaction data for a consumer, and constructs the transaction statistics for the prior time period for input into selected ones of the merchant segment predictive models.

19. A system for forming merchant segments, comprising:

a data processing module that receives consumer transaction data for a plurality of consumer accounts, and organizes the transaction data by account, and within account, sequences the transactions by time;

a data processing module that determines from the sequenced transaction data an expected frequency of co-occurrence for each merchant, and that constructs for each merchant a merchant vector as a function of unexpected frequency of co-occurrences of the merchant; and a clustering module that clusters the merchant vectors into merchant segment by determining merchant vectors that are closely aligned with each other.

\* \* \* \* \*

UNITED STATES PATENT AND TRADEMARK OFFICE
CERTIFICATE OF CORRECTION

PATENT NO. : 6,430,539 B1  Page 1 of 1
APPLICATION NO. : 09/306237
DATED : August 6, 2002
INVENTOR(S) : Michael A. Lazarus et al.

It is certified that error appears in the above-identified patent and that said Letters Patent is hereby corrected as shown below:

On the Title Page item 75, replace listed inventor "A.U. Mattias Blume" with "A.U. Matthias Blume" and listed inventor "Gerald S. Russell" with "Gerald R. Russell"

Signed and Sealed this

Twenty-seventh Day of April, 2010

David J. Kappos
*Director of the United States Patent and Trademark Office*